(12) United States Patent
Shirai

(10) Patent No.: US 7,679,694 B2
(45) Date of Patent: Mar. 16, 2010

(54) LIQUID CRYSTAL DISPLAY DEVICE COMPRISING A FRAME HAVING THROUGH HOLES AT A BOTTOM PORTION AND A FRAME-LIKE MOLD HAVING PROTRUSIONS WHICH INSERT INTO THE THROUGH HOLES

(75) Inventor: Kouichi Shirai, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 381 days.

(21) Appl. No.: 11/471,709

(22) Filed: Jun. 21, 2006

(65) Prior Publication Data
US 2007/0002206 A1    Jan. 4, 2007

(30) Foreign Application Priority Data
Jun. 29, 2005 (JP) ............................ 2005-189234

(51) Int. Cl.
G02F 1/1333 (2006.01)
F21V 7/04 (2006.01)
(52) U.S. Cl. ........................................ 349/58; 362/632
(58) Field of Classification Search ........................ None
See application file for complete search history.

(56) References Cited

U.S. PATENT DOCUMENTS

| 5,274,486 | A  | * | 12/1993 | Yamazaki et al. | ............. 349/58 |
| 6,974,242 | B1 | * | 12/2005 | Chu et al. | ................... 362/633 |
| 2003/0043310 | A1 | * | 3/2003 | Cho | ............................ 349/58 |
| 2003/0169383 | A1 | * | 9/2003 | Kim | ............................. 349/58 |
| 2005/0105011 | A1 | * | 5/2005 | An | ............................... 349/58 |

* cited by examiner

Primary Examiner—Andrew Schechter
Assistant Examiner—Paisley L Arendt
(74) Attorney, Agent, or Firm—Stites & Harbison PLLC; Juan Carlos A. Marquez, Esq.

(57) ABSTRACT

A liquid crystal display device includes a liquid crystal display panel having liquid crystal material sandwiched between a pair of substrates, optical components disposed behind the liquid crystal display panel, a frame-like mold which houses the liquid crystal display panel and the optical components, and a frame which houses the frame-like mold. The frame includes a bottom portion and a sidewall, and the bottom portion is provided with plural engaging through holes which are formed along the sidewall not to extend into the sidewall. The frame-like mold is provided with plural engaging protrusions which are disposed correspondingly to the engaging holes and protrude downward beyond a lower surface of the frame-like mold. The frame-like mold and the frame are fixed together by inserting each of the engaging protrusions into a corresponding one of the engaging through holes.

5 Claims, 24 Drawing Sheets

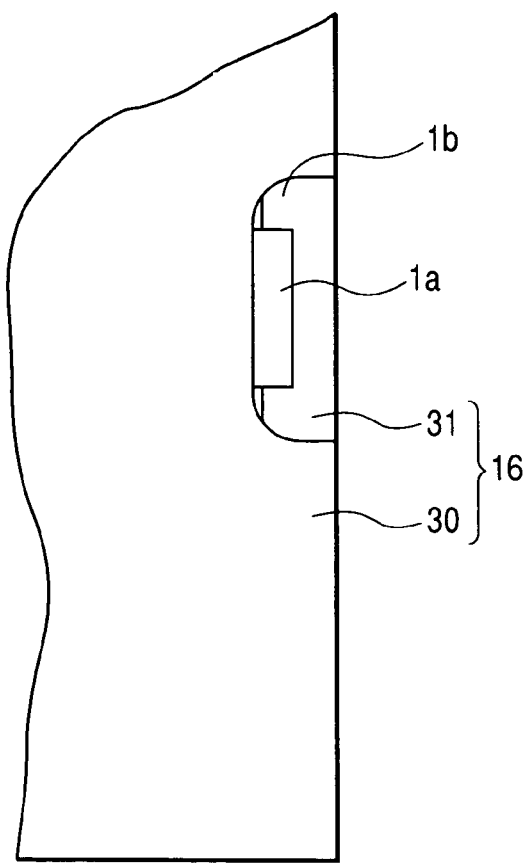
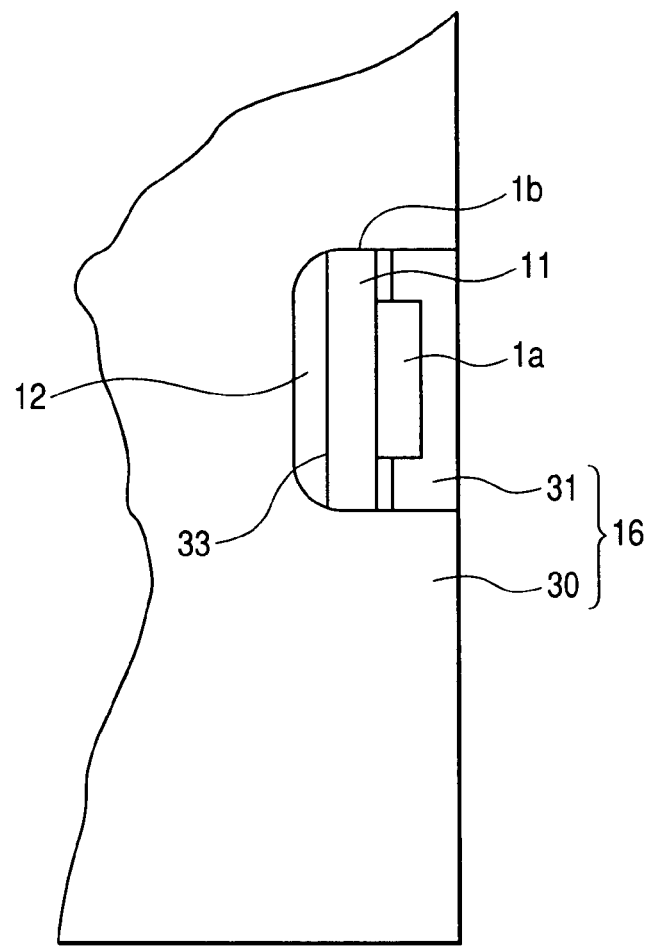

LIQUID CRYSTAL DISPLAY DEVICE COMPRISING A FRAME HAVING THROUGH HOLES AT A BOTTOM PORTION AND A FRAME-LIKE MOLD HAVING PROTRUSIONS WHICH INSERT INTO THE THROUGH HOLES

CLAIM OF PRIORITY

The present application claims priority from Japanese application serial no. 2005-189234, filed on Jun. 29, 2005, the content of which is hereby incorporated by reference into this application.

BACKGROUND OF THE INVENTION

The present invention relates to a liquid crystal display device, and in particular to a technology useful for application to a backlight of a liquid crystal display device.

Widely used as display sections of portable equipment such as mobile phones are TFT (Thin Film Transistor) type liquid crystal display modules each provided with a small-sized color liquid crystal panel having subpixels in the order of 240×320×3 in number.

FIG. 16A is a schematic exploded perspective view illustrating a rough configuration of a conventional liquid crystal display module. As shown in FIG. 16A, in the conventional liquid crystal display module, arranged in the order shown in FIG. 16A within a metal frame 16, for example, a die cast frame made of magnesium alloy, are a liquid crystal display panel LCD, a mold 11 formed of synthetic resin, for example, and a light reflective sheet 12. Disposed within the mold 11 are a light guide 10, a group of optical sheets (upper and lower light diffusing sheets and a lens sheet) 15, and a light source (white light emitting diodes) 13.

The liquid crystal display panel LCD is fabricated by attaching together a glass substrate TFTSUB provided with thin film transistors, drain lines, gate lines and others (not shown) and a glass substrate CFSUB provided with a counter electrode, color filters and others (not shown) with a sealing agent (not shown) interposed therebetween, then filling a liquid crystal material (not shown) into a space between the two glass substrates TFTSUB, CFSUB, and sealing off the space, and then attaching polarizing sheets POL1 and PLO2 on the outer surfaces of the two glass substrates TFTSUB and CFSUB, respectively. In FIG. 16A, reference character DRV denote semiconductor chips for driving the subpixels of the liquid crystal display panel LCD The frame 16 in FIG. 16A is required to be electro-conductive so as to prevent EMI (Electromagnetic Interference) and mechanically strong, and therefore the frame 16 is formed of a magnesium alloy die cast, for example.

FIG. 16B is a cross-sectional view of the conventional liquid crystal display module of FIG. 16A in the assembled condition taken along line XVIB-XVIB of FIG. 16A. The liquid crystal display panel LCD is attached to a recess formed in the mold 11 by using double-faced adhesive tapes 100.

FIGS. 17A and 17B are illustrations for explaining the mold 11 shown in FIGS. 16A and 16B, FIG. 17A is a plan view of the mold 11, and FIG. 17B is a cross-sectional view of the mold 11 taken along line XVIIB-XVIIB of FIG. 17A. As shown in FIGS. 17A and 17B, the mold 11 shown in FIG. 16A is of the shape of a frame (or a cylinder) having a rectangular cross section, and is formed with engaging portions 1*a*.

FIGS. 18A-18C are illustrations for explaining the frame 16 shown in FIGS. 16A and 16B, FIG. 18A is a plan view of the frame 16, and FIG. 18B is a cross-sectional view of the frame 16 taken along line XVIIIB-XVIIIB of FIG. 18A, FIG. 18C is an enlarged view of an encircled portion A of FIG. 18B, and FIG. 18D is an enlarged perspective view of the encircled portion A of FIG. 18B. As shown in FIGS. 18A-18D, the frame 16 has a bottom portion 30 and a sidewall 31 formed along the peripheries of the bottom portion 30, and the frame 16 has through holes 1*b* therein extending continuously from the bottom portion 30 to the sidewall 31.

FIGS. 19A-19C are illustrations for explaining a method of fixing together the mold 11 and the frame 16 shown in FIG. 16A, FIG. 19A is a plan view of an assembly of the mold 11 and the frame 16, FIG. 19B is a cross-sectional view of the assembly of FIG. 19A taken along line XIXB-XIXB of FIG. 19A, and FIG. 19C is an enlarged view of an encircled portion B of FIG. 19B. Incidentally, the liquid crystal display panel LCD, the light guide 10, the group of optical sheets 15 or the light source 13 are not shown in FIGS. 19A-19C for the sake of simplicity.

As shown in FIGS. 19A-19C, the mold 11 is fixed to the frame 16 by inserting the engaging portions 1*a* formed in the sidewall of the mold 11 into the through holes 1*b* formed in the frame 16, and engaging tips of the engaging portions 1*a* with the sidewall of the frame 16 (or hooking the tips of the engaging portions 1*a* to the sidewall of the frame 16).

Incidentally, the shapes of the mold 11 and the frame 16 are schematically illustrated in FIGS. 16A-19C and later-explained figures for explaining the features of the present invention clearly, and therefore they do not always represent the shapes of the mold 11 and the frame 16 in practical applications.

SUMMARY OF THE INVENTION

There was a problem with the method of fixing together the mold 11 and the frame 16 explained in connection with FIGS. 19A-19C, in that, as shown in FIG. 19C, light from the light source (white light emitting diodes) 13 (see FIG. 16A) leaks in an X direction (a direction indicated by an arrow C in FIG. 19C) and a Y direction (a direction indicated by an arrow D in FIG. 19C) via the through hole 1*b* formed in the frame 16.

However, since it is necessary to visually check the engaging portions 1*a* formed in the sidewall of the mold 11 and the through holes 1*b* in the frame 16, for the purpose of seeing whether the mold 11 and the frame 16 are fixed together properly after assembling of the liquid crystal display module, it was difficult to prevent the above-explained leakage of light.

The present invention has been made to solve the above-explained problems with the prior art, and it is an object of the present invention to provide a technology capable of reducing leakage of light from a backlight of a liquid crystal display device. The above-mentioned and other objects and novel features of the present invention will become more apparent by reference to the following detailed description taken in conjunction with accompanying drawings.

The following will explain briefly the summary of the representative ones of the inventions disclosed in this specification.

(1) A liquid crystal display device comprising: a liquid crystal display panel having liquid crystal material sandwiched between a pair of substrates; optical components disposed behind said liquid crystal display panel; a frame-like mold which houses said liquid crystal display panel and said optical components; a light reflective sheet disposed behind said frame-like mold; and a frame which houses said frame-like mold and said light reflective sheet, wherein said frame comprises a bottom portion and a sidewall formed along a periphery of said bottom portion, said bottom portion is provided with a plurality of engaging through holes which are formed along said sidewall not to extend into said sidewall, said light reflective sheet is disposed on an upper surface of said bottom portion of said frame, and is provided with a plurality of cutouts disposed correspondingly to said plurality of engaging through holes such that said light reflective sheet does not lie over said plurality of engaging through holes, said frame-like mold is provided with a plurality of engaging protrusions which are disposed correspondingly to said plurality of engaging holes and protrude downward beyond a lower surface of said frame-like mold, and said frame-like mold and said frame are fixed together by inserting each of said plurality of engaging protrusions into a corresponding one of said plurality of engaging through holes.

(2) The liquid crystal display device according to (1), wherein said frame-like mold and said frame are fixed together by engaging tips of said plurality of engaging protrusions with said sidewall of said frame.

(3) The liquid crystal display device according to (1), wherein said frame-like mold is provided with a step on said lower surface thereof for positioning an edge of said light reflective sheet such that said step does not lie over said plurality of engaging through holes.

(4) A liquid crystal display device comprising: a liquid crystal display panel having liquid crystal material sandwiched between a pair of substrates; optical components disposed behind said liquid crystal display panel; a frame-like mold which houses said liquid crystal display panel and said optical components; and a frame which houses said frame-like mold, wherein said frame comprises a bottom portion and a sidewall formed along a periphery of said bottom portion, said bottom portion is provided with a plurality of engaging through holes which are formed along said sidewall not to extend into said sidewall, said frame-like mold is provided with a plurality of engaging protrusions which are disposed correspondingly to said plurality of engaging holes and protrude downward beyond a lower surface of said frame-like mold, and said frame-like mold and said frame are fixed together by inserting each of said plurality of engaging protrusions into a corresponding one of said plurality of engaging through holes.

(5) The liquid crystal display device according to (4), wherein said frame-like mold and said frame are fixed together by engaging tips of said plurality of engaging protrusions with said sidewall of said frame.

(6) A liquid crystal display device comprising: a liquid crystal display panel having liquid crystal material sandwiched between a pair of substrates; optical components disposed behind said liquid crystal display panel; a frame-like mold which houses said liquid crystal display panel and said optical components; and a frame which houses said frame-like mold, wherein said frame comprises a bottom portion and a sidewall formed along a periphery of said bottom portion, said frame is provided with a plurality of engaging through holes formed along said sidewall, each of said plurality of engaging through holes extends from said bottom portion into a portion of said sidewall, said frame is further provided with a wall-like protrusion parallel with said side wall protruding from an edge of each of said plurality of engaging through holes, said edge facing toward an inside of said frame, said frame-like mold is provided with a plurality of engaging protrusions protruding horizontally from a sidewall thereof, said plurality of engaging protrusions being disposed correspondingly to said plurality of engaging holes, and said frame-like mold and said frame are fixed together by inserting each of said plurality of engaging protrusions of said frame-like mold into a corresponding one of said plurality of engaging through holes.

(7) The liquid crystal display device according to (6), wherein said frame-like mold and said frame are fixed together by engaging tips of said plurality of engaging protrusions with said sidewall of said frame.

(8) The liquid crystal display device according to (6), further comprising a light reflective sheet disposed on an upper surface of said bottom portion of said frame, wherein said light reflective sheet is provided with a plurality of cutouts disposed correspondingly to said plurality of engaging through holes such that said light reflective sheet does not lie over said plurality of engaging through holes.

(9) The liquid crystal display device according to (6), further comprising a light reflective sheet disposed on an upper surface of said bottom portion of said frame, wherein said frame-like mold is provided with a step on said lower surface thereof for positioning an edge of said light reflective sheet such that said step does not lie over said plurality of engaging through holes.

(10) The liquid crystal display device according to (8), wherein said frame-like mold is provided with a step on said lower surface thereof for positioning an edge of said light reflective sheet such that said step does not lie over said plurality of engaging through holes.

(11) A liquid crystal display device comprising: a liquid crystal display panel having liquid crystal material sandwiched between a pair of substrates; optical components disposed behind said liquid crystal display panel; a frame-like mold which houses said liquid crystal display panel and said optical components; a light reflective sheet disposed behind said frame-like mold; and a frame which houses said frame-like mold and said light reflective sheet, wherein said frame comprises a bottom portion and a sidewall formed along a periphery of said bottom portion, said frame is provided with a plurality of engaging through holes which are formed along said sidewall, each of said plurality of engaging through holes extends from said bottom portion into a portion of said sidewall, said light reflective sheet is disposed on an upper surface of said bottom portion of said frame, and is provided with a plurality of cutouts disposed correspondingly to said plurality of engaging through holes such that said light reflective sheet does not lie over said plurality of engaging through holes, said frame-like mold is provided with a plurality of engaging protrusions protruding therefrom and disposed correspondingly to said plurality of engaging holes, and said frame-like mold and said frame are fixed together by inserting each of said plurality of engaging protrusions of said frame-like mold into a sidewall-side portion of a corresponding one of said plurality of engaging through holes.

(12) A liquid crystal display device comprising: a liquid crystal display panel having liquid crystal material sandwiched between a pair of substrates; optical components disposed behind said liquid crystal display panel; a frame-like mold which houses said liquid crystal display panel and said optical components; a light reflective sheet disposed behind said frame-like mold; and a frame which houses said frame-like mold and said light reflective sheet, wherein said frame comprises a bottom portion and a sidewall formed along a periphery of said bottom portion, said frame is provided with a plurality of engaging through holes which are formed along said side wall, each of said plurality of engaging through holes extends from said bottom portion into a portion of said sidewall, said light reflective sheet is disposed on an upper surface of said bottom portion of said frame, said frame-like mold is provided with a plurality of engaging protrusions protruding therefrom and disposed correspondingly to said plurality of engaging holes, said frame-like mold is further provided with a step on said lower surface thereof for positioning an edge of said light reflective sheet such that said step does not lie over said plurality of engaging through holes, and said frame-like mold and said frame are fixed together by inserting each of said plurality of engaging protrusions of said frame-like mold into a sidewall-side portion of a corresponding one of said plurality of engaging through holes.

(13) The liquid crystal display device according to (12), wherein said light reflective sheet is provided with a plurality of cutouts disposed correspondingly to said plurality of engaging through holes such that said light reflective sheet does not lie over said plurality of engaging through holes.

(14) The liquid crystal display device according to (12), wherein said frame is further provided with a wall-like protrusion parallel with said side wall protruding from an edge of each of said plurality of engaging through holes, said edge facing toward an inside of said frame.

(15) The liquid crystal display device according to (12), wherein said frame-like mold and said frame are fixed together by engaging tips of said plurality of engaging protrusions with said sidewall of said frame.

(16) A liquid crystal display device comprising: a liquid crystal display panel having liquid crystal material sandwiched between a pair of substrates; optical components disposed behind said liquid crystal display panel; a frame-like mold which houses said liquid crystal display panel and said optical components; and a frame which houses said frame-like mold, wherein said frame-like mold is provided with a plurality of protrusions protruding from an upper surface of said frame-like mold, each of said plurality of protrusions is provided with an engaging through hole, said frame comprises a bottom portion and a sidewall formed along a periphery of said bottom portion, said sidewall is provided with a plurality of engaging protrusions correspondingly to said engaging through holes, and said frame-like mold and said frame are fixed together by inserting each of said plurality of engaging protrusions into a corresponding one of said engaging through holes in said frame-like mold.

(17) The liquid crystal display device according to (16), wherein said frame-like mold and said frame are fixed together by engaging tips of said plurality of engaging protrusions with vicinities of said engaging through holes in said frame-like mold.

(18) A liquid crystal display device comprising: a liquid crystal display panel having liquid crystal material sandwiched between a pair of substrates; optical components disposed behind said liquid crystal display panel; a frame-like mold which houses said liquid crystal display panel and said optical components; and a frame which houses said frame-like mold, wherein said frame-like mold is provided with a plurality of protrusions protruding therefrom, said frame comprises a bottom portion and a sidewall formed along a periphery of said bottom portion, said sidewall is provided with a plurality of engaging recesses correspondingly to said plurality of engaging protrusions, and said frame-like mold and said frame are fixed together by inserting each of said plurality of engaging protrusions of said frame-like mold into a corresponding one of said plurality of recesses.

To be brief, the advantage provided by the representative ones of the inventions disclosed in this specification is that the liquid crystal display device in accordance with the present invention is capable of reducing the leakage of light from its backlight.

BRIEF DESCRIPTION OF THE DRAWINGS

In the accompanying drawings, in which like reference numerals designate similar components throughout the figures, and in which:

FIG. 8A is an illustration for explaining a frame in accordance with still another embodiment of the present invention;

FIG. 8B is an illustration for showing a through hole made in a prior art frame explained in connection with FIGS. 17A to 19C;

DETAILED DESCRIPTION OF THE PREFERRED EMBODIMENTS

Figure 1A:
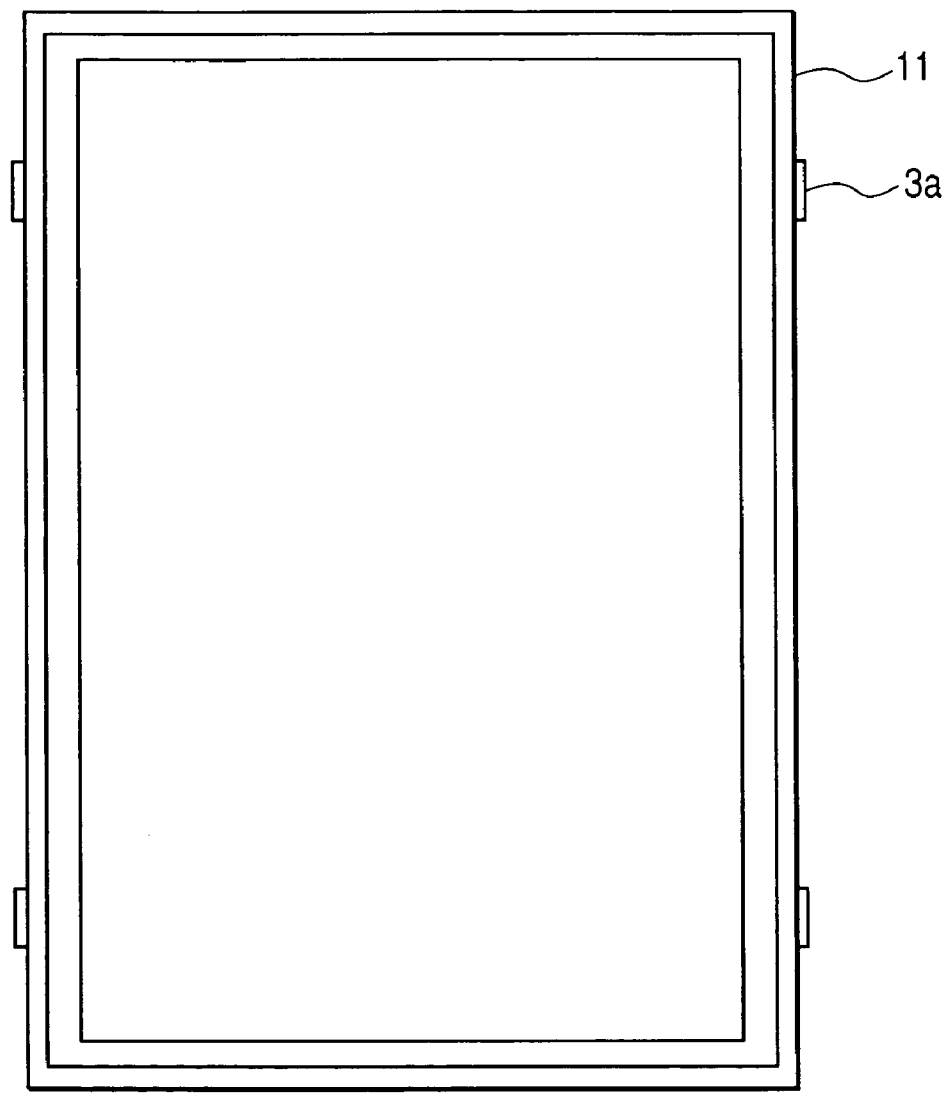
FIG. 1A is a plan view of a mold in accordance with an embodiment of the present invention.

The embodiments of the present invention will be explained in detail by reference to the drawings. The same reference numerals or symbols designate functionally similar components or portions throughout the figures for explaining the embodiments, and repetition of their explanation is omitted. Dimensions of certain of the components or portions are exaggerated for clarity.

Liquid crystal display modules of the embodiments in accordance with the present invention are TFT type liquid crystal display modules provided with a small-sized color liquid crystal display panel having subpixels on the order of 240×320×3 pieces, and they are used as display sections of portable equipment such as mobile phones and the like.

Embodiment 1

Figure 16A:
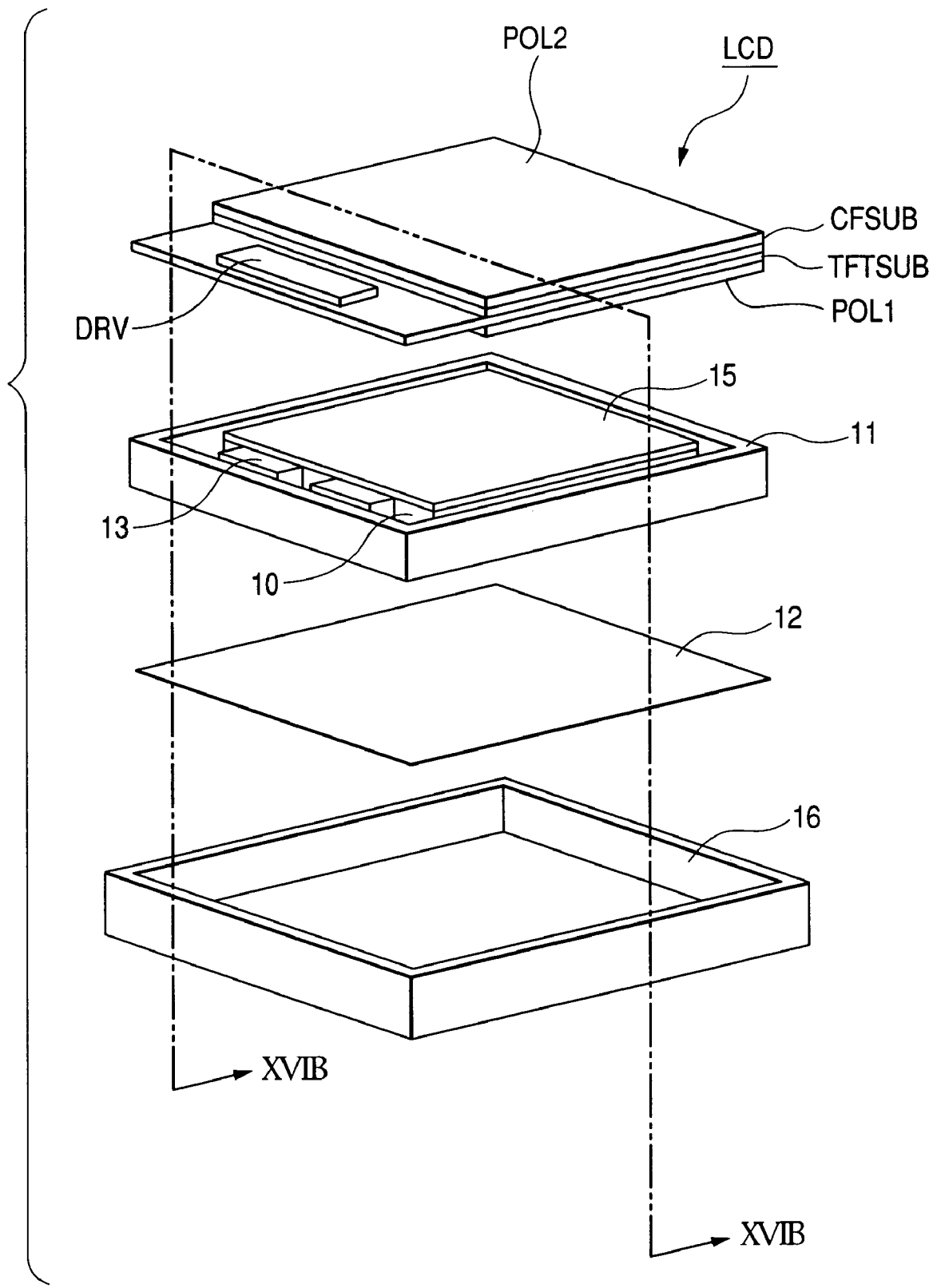
FIG. 16A is a schematic exploded perspective view illustrating a rough configuration of a conventional liquid crystal display module.
Figure 16B:
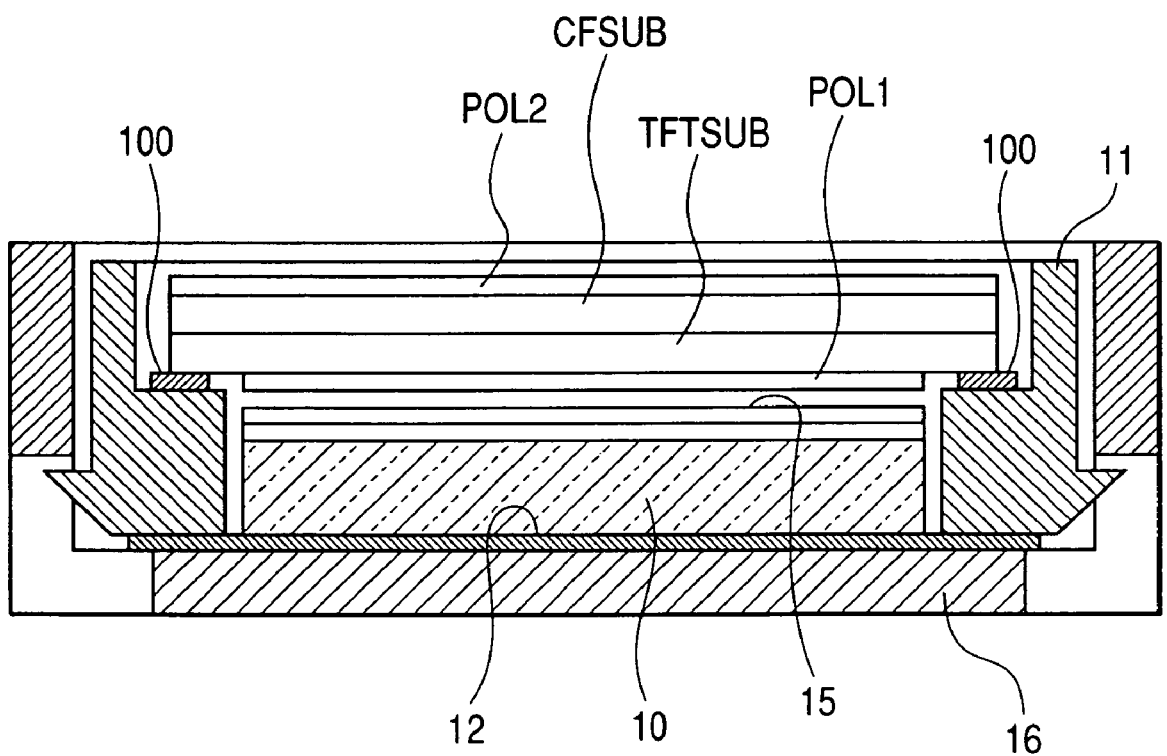
FIG. 16B is a cross-sectional view of the conventional liquid crystal display module of FIG. 16A in an assembled condition taken along line XVIB-XVIB of FIG. 16A.

As in the case of the liquid crystal display panel LCD illustrated in FIGS. 16A and 16B, a liquid crystal display panel LCD in accordance with Embodiment 1 is fabricated by attaching together a glass substrate TFTSUB provided with thin film transistors, drain lines, gate lines and others (not shown) and a glass substrate CFSUB provided with a counter electrode, color filters and others (not shown) with a sealing agent (not shown) interposed therebetween, then filling a liquid crystal material (not shown) into a space between the two glass substrates TFTSUB, CFSUB, and sealing off the space, and then attaching polarizing sheets POL1 and PLO2 on the outer surfaces of the two glass substrates TFTSUB and CFSUB, respectively.

Since the present invention does not relates to an internal structure of the liquid crystal display panel LCD, the explanation of the details of the internal structure is omitted. The present invention is applicable to liquid crystal display panels LCD having any types of structures.

In the liquid crystal display modules in Embodiment 1 and subsequent Embodiments, the explanation of components or portions similar to those in the conventional liquid crystal display module illustrated in FIGS. 16A and 16B is omitted.

Figure 1B:
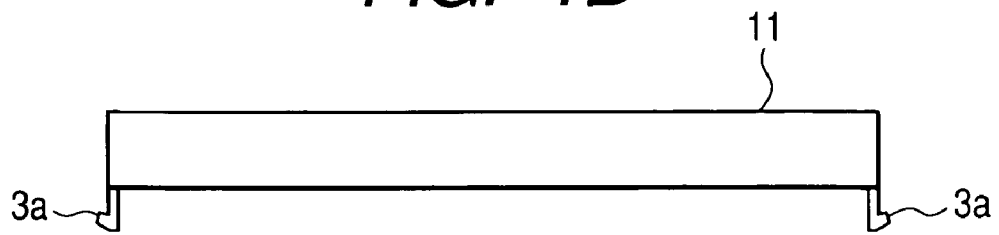
FIG. 1B is a side view of the mold of FIG. 1A.

FIGS. 1A and 1B are illustrations for explaining a mold 11 in Embodiment 1, FIG. 1A is a plan view of the mold 11, and FIG. 1B is a side view of the mold 11.

Figure 17A:
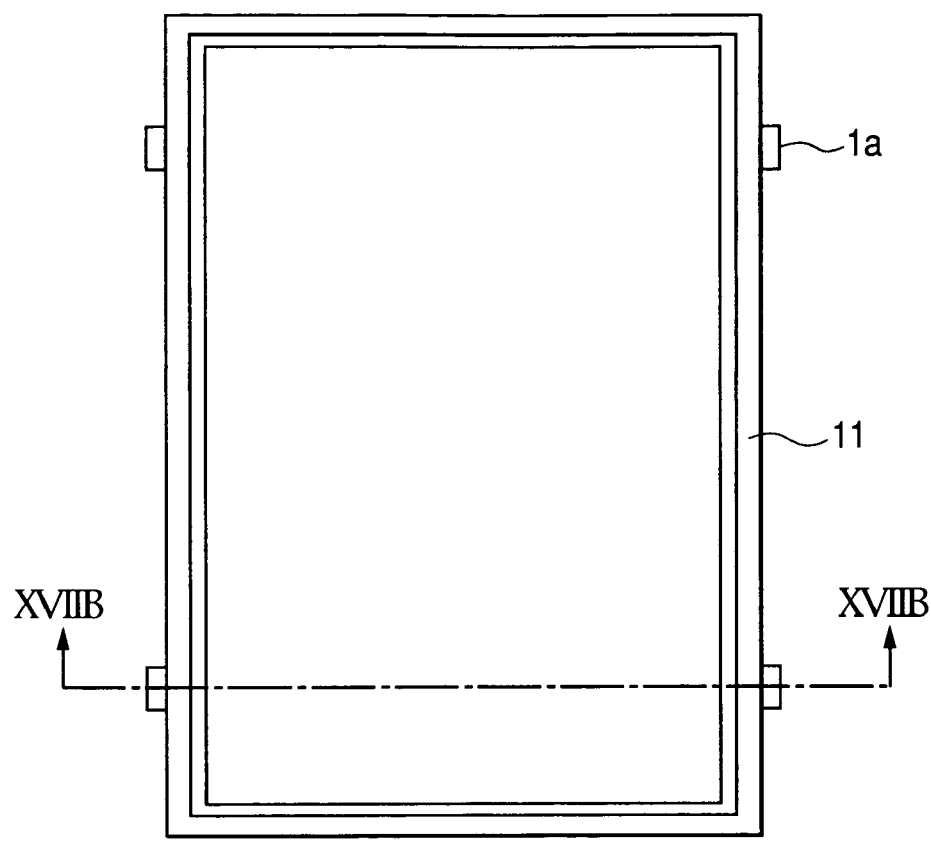
FIG. 17A is a plan view of a conventional mold.
Figure 17B:
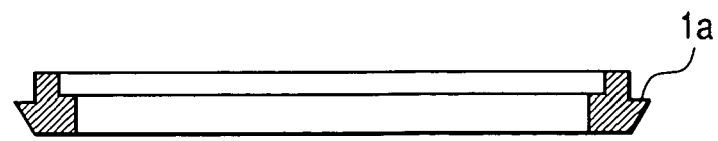
FIG. 17B is a cross-sectional view of the mold taken along line XVIIB-XVIIB of FIG. 17A.

As shown in FIGS. 1A and 1B, the mold 11 differs from the mold 11 shown in FIGS. 17A and 17B, in that the mold 11 of Embodiment 1 has a frame-like member (or a cylinder-like member) having a rectangular vertical cross section and is provided with protrusions 3a protruding downward from the frame-like member (or the cylinder-like member) which are used for engaging.

Figure 2A:
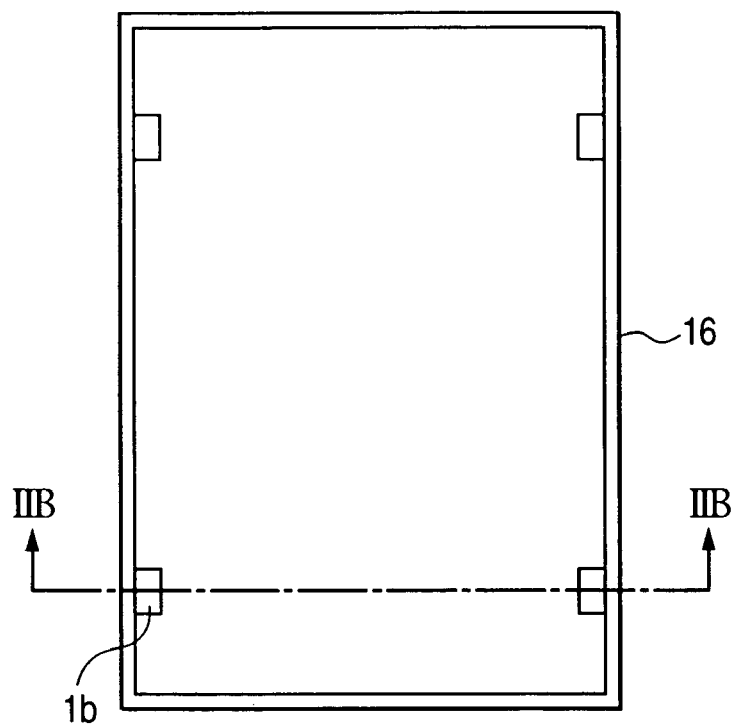
FIG. 2A is a plan view of a frame in accordance with an embodiment of the present invention.
Figure 2B:
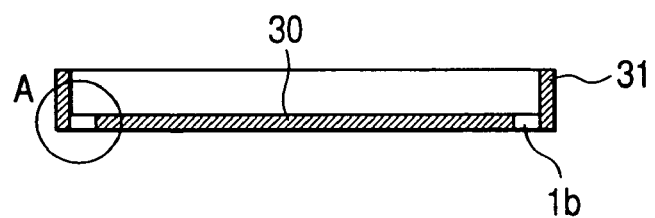
FIG. 2B is a cross-sectional view of the frame of FIG. 2A taken along line IIB-IIB of FIG. 2A.
Figure 2C:
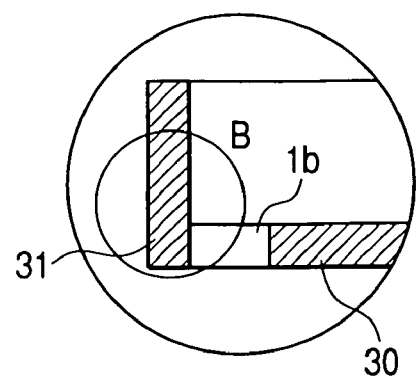
FIG. 2C is an enlarged view of a circled portion, designated A, of the frame of FIG. 2B.
Figure 2D:
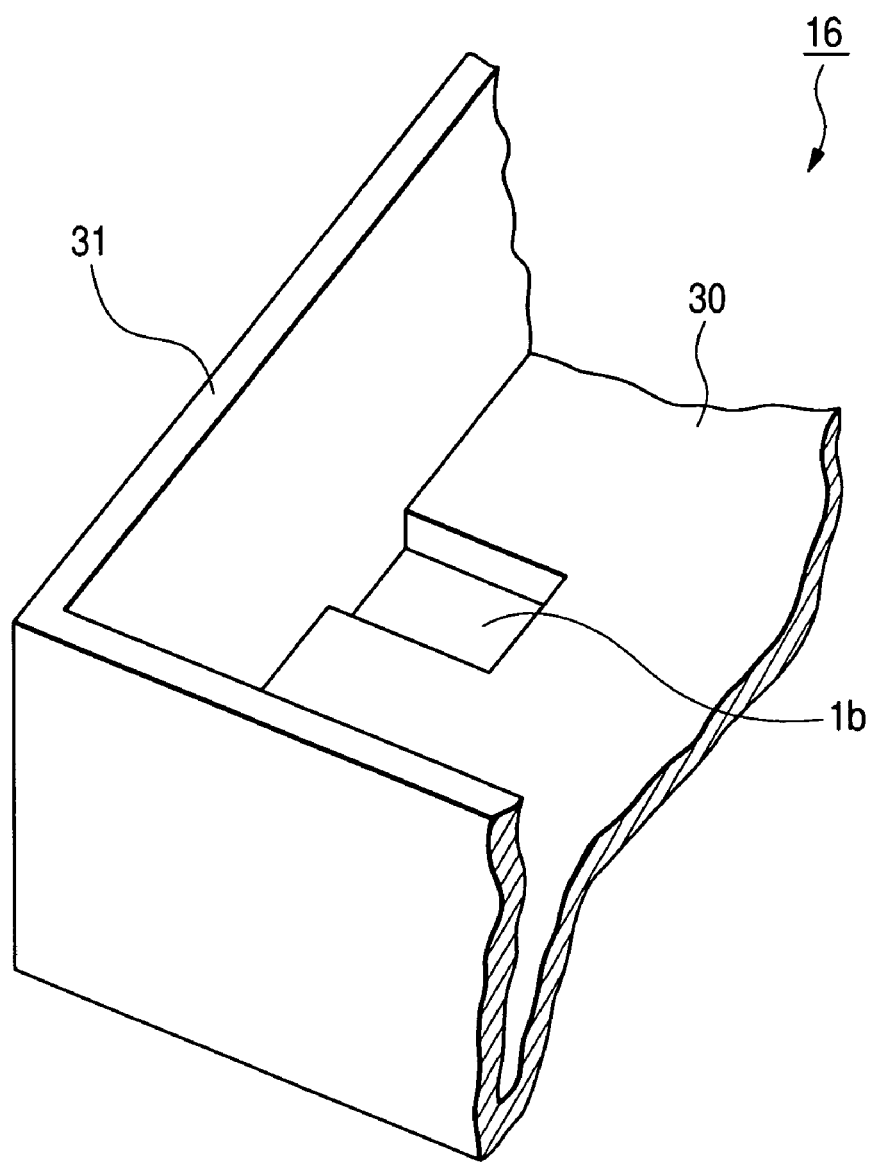
FIG. 2D is a perspective view of the circled portion A of the frame 16 of FIG. 2B.

FIGS. 2A to 2D are illustrations for explaining a frame 16 in Embodiment 1, FIG. 2A is a plan view of the frame 16, FIG. 2B is a cross-sectional view of the frame 16 of FIG. 2A taken along line IIB-IIB of FIG. 2A, FIG. 2C is an enlarged view of a circled portion, designated A, of the frame 16 of FIG. 2B, and FIG. 2D is a perspective view of the circled portion A of the frame 16 of FIG. 2B.

As shown in FIGS. 2A to 2D, the frame 16 of Embodiment 1 has a bottom portion 30 and a sidewall 30 formed at the periphery of the bottom portion 30, through holes 1b are made in the bottom portion 30 of the frame 16 along the sidewall 31 such that through holes 1b do not extend into the sidewall 31.

Figure 18A:
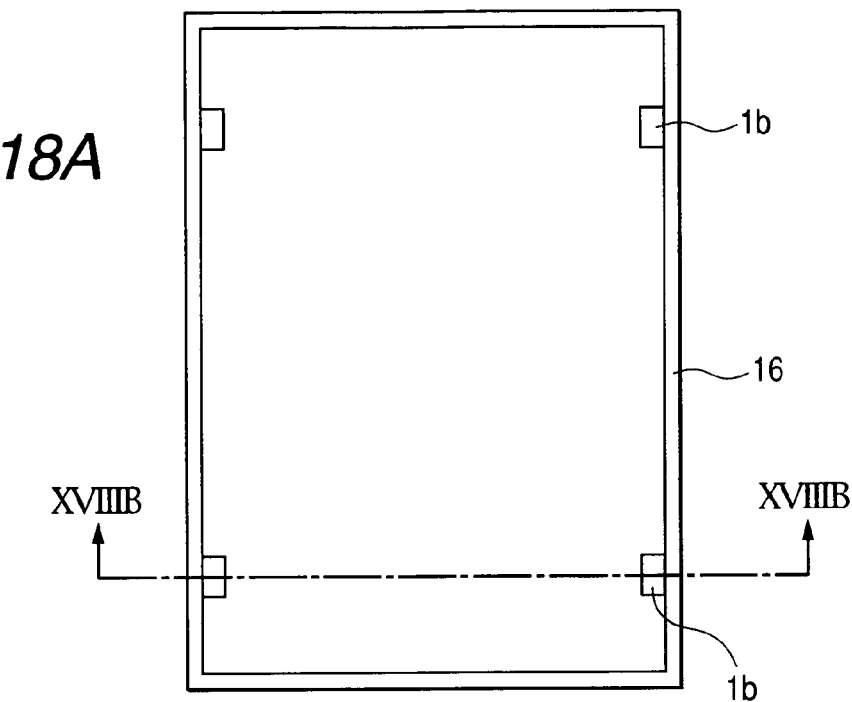
FIG. 18A is a plan view of the conventional frame.
Figure 18B:
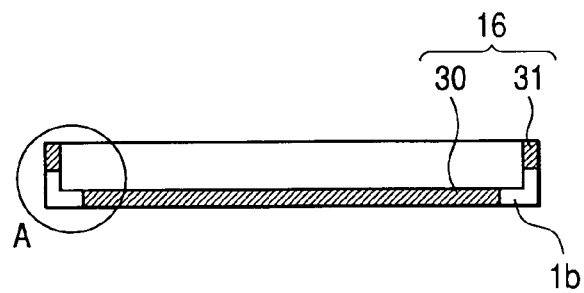
FIG. 18B is a cross-sectional view of the frame taken along line XVIIIB-XVIIIB of FIG. 18A.
Figure 18C:
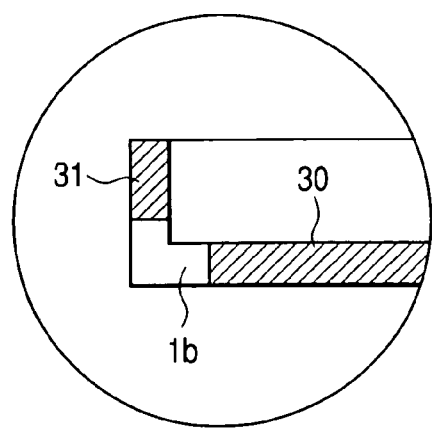
FIG. 18C is an enlarged view of an encircled portion A of FIG. 18B.
Figure 18D:
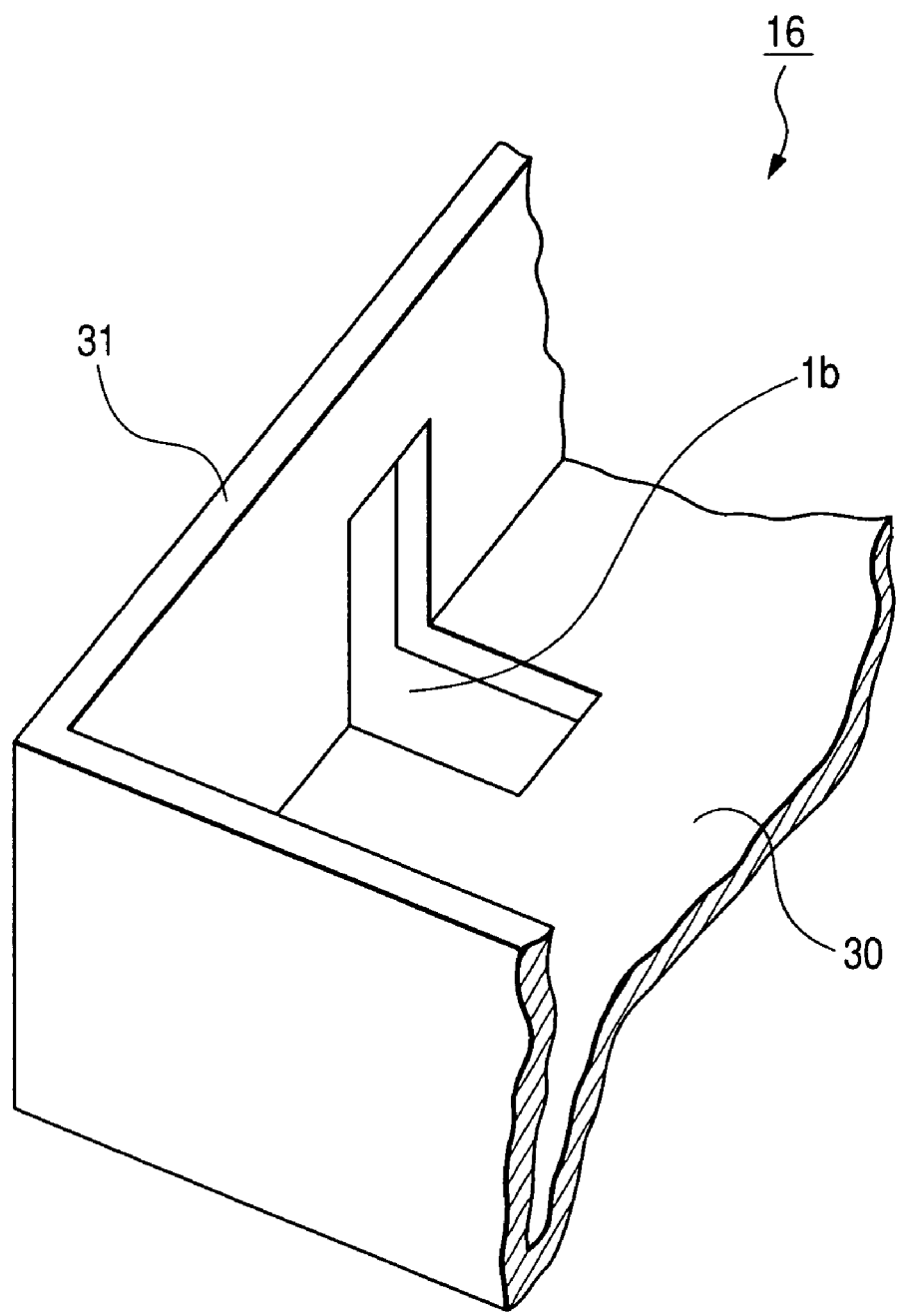
FIG. 18D is an enlarged perspective view of the encircled portion A of FIG. 18B.

As shown in a portion B of FIG. 2C and FIG. 2D, the frame 16 of Embodiment 1 differs from the frame 16 shown in FIGS. 18C and 18D, in that, in Embodiment 1, portions of the sidewall 31 adjacent to the through holes 1b are extended to a plane flush with a lower surface of the bottom portion 30.

Figure 3A:
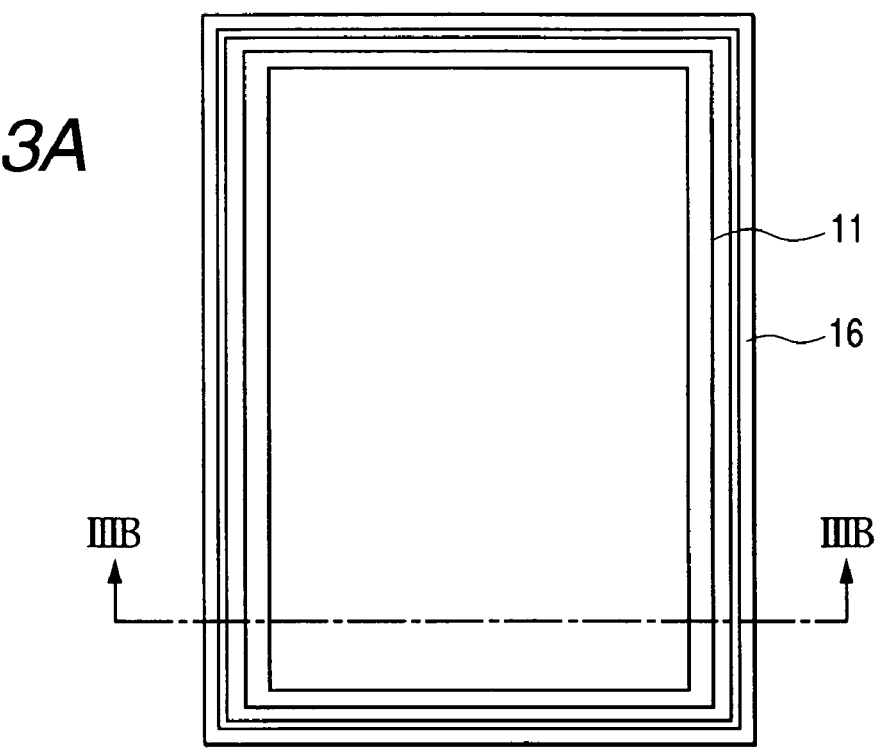
FIG. 3A is a plan view illustrating a condition where the mold is inserted within the frame.
Figure 3B:
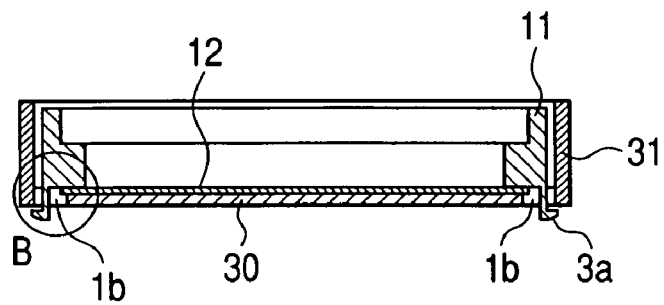
FIG. 3B is a cross-sectional view of the mold and the frame of FIG. 3A taken along line IIIB-IIIB of FIG. 3A.
Figure 3C:
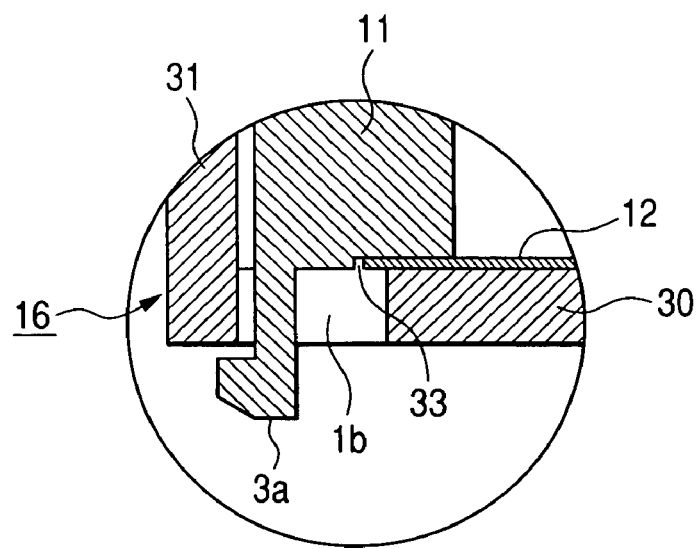
FIG. 3C is an enlarged cross-sectional view of a circled portion, designated B, of FIG. 3B.
Figure 3D:
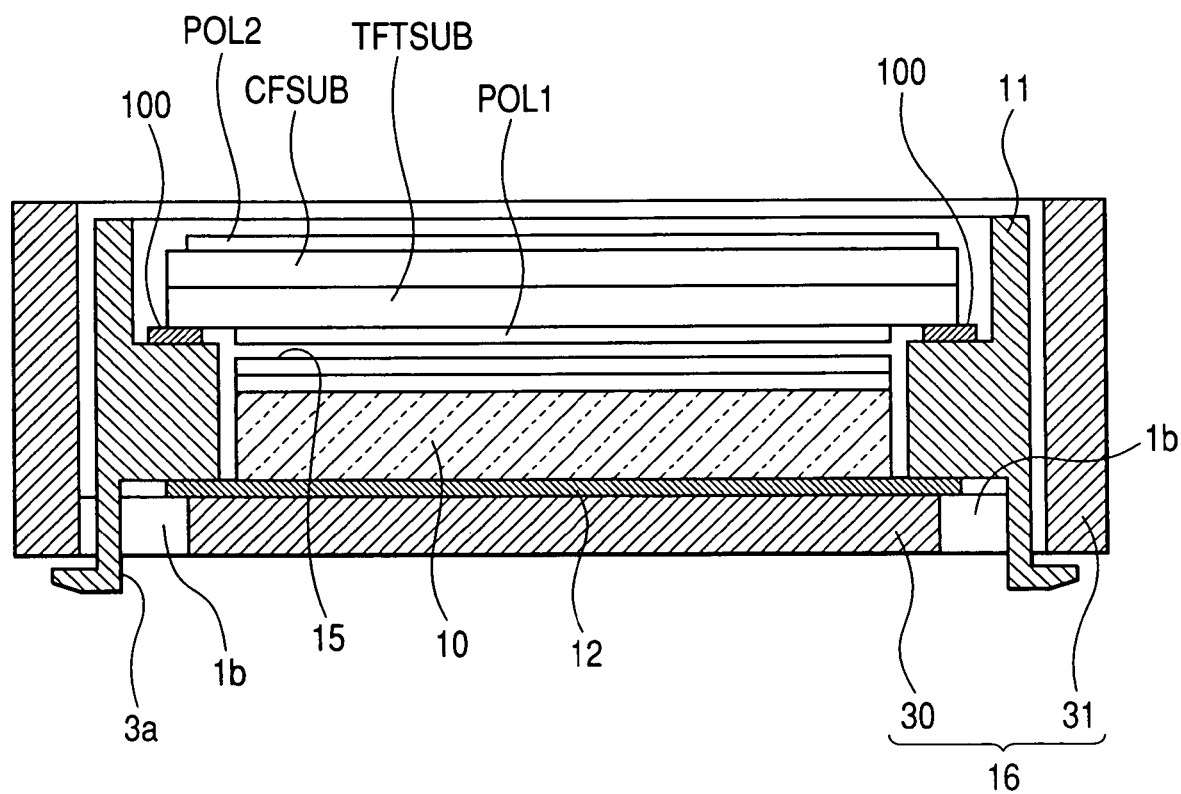
FIG. 3D is a cross-sectional view of a liquid crystal display module of Embodiment 1 in an assembled condition.

FIGS. 3A to 3D are illustrations for explaining a method of fixing together the mold 11 and the frame 16 in Embodiment 1. FIG. 3A is a plan view illustrating the condition where the mold 11 is inserted within the frame 16, FIG. 3B is a cross-sectional view of the mold 11 and the frame 16 of FIG. 3A taken along line IIIB-IIIB of FIG. 3A, and FIG. 3C is an enlarged view of a circled portion, designated B, of FIG. 3B. For the sake of simplicity, the liquid crystal display panel LCD, the light guide 10, the group of optical sheets 15 or the light source 13 are not shown in FIGS. 3A to 3C. FIG. 3D is across-sectional view of the liquid crystal display module of Embodiment 1 in the assembled condition, and is similar to FIG. 16B illustrating the cross-sectional view of the conventional liquid crystal display module.

As shown in FIGS. 3A to 3D, the mold 11 is fixed to the frame 16 by inserting the engaging protrusions 3a provided to the mold 11 into the through holes 1b made in the bottom portion 30 of the frame 16, and engaging the tips of the engaging protrusions 3a with the sidewall 31 of the frame 16 (or hooking the tips to the sidewall 31).

Figure 19A:
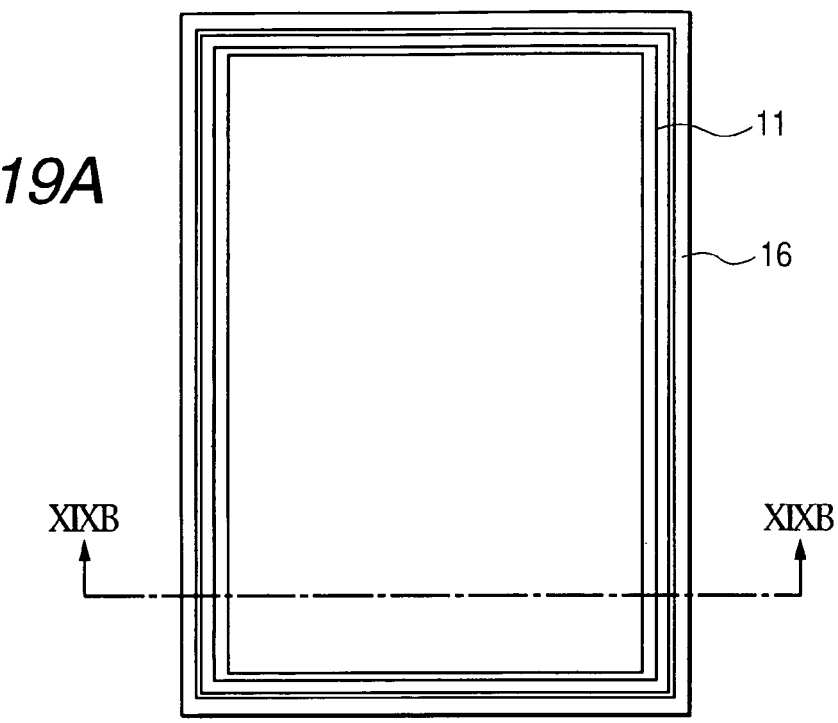
FIG. 19A is a plan view of an assembly of the conventional mold and the conventional frame.
Figure 19B:
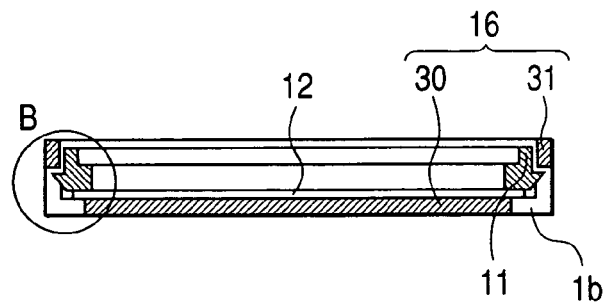
FIG. 19B is a cross-sectional view of the assembly of FIG. 19A taken along line XIXB-XIXB of FIG. 19A.
Figure 19C:
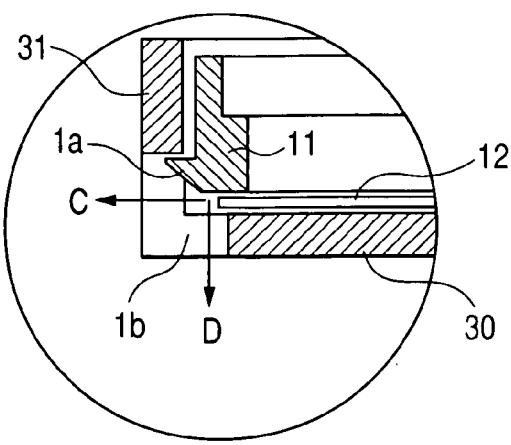
FIG. 19C is an enlarged view of an encircled portion B of FIG. 19B.

As explained above, there has been a problem in that in the case of the configuration illustrated in FIGS. 19A to 19C, light from the light source (a white light emitting diode) 13 (not shown) leaks through the through holes 1b made in the frame 16 in the X direction (the direction of the arrow C in FIG. 19C) and the Y direction (the direction of the arrow D in FIG. 19C). On the other hand, as shown in FIGS. 2D and 3C, in Embodiment 1, the through holes 1b does not extend into the sidewall 31 of the frame 16, and consequently, Embodiment 1 is capable of reducing the amount of the light from the light source 13 leaking in the X direction (the direction of the arrow C in FIG. 19C) through the through holes 1b made in the frame 16.

Embodiment 2

Figure 4A:
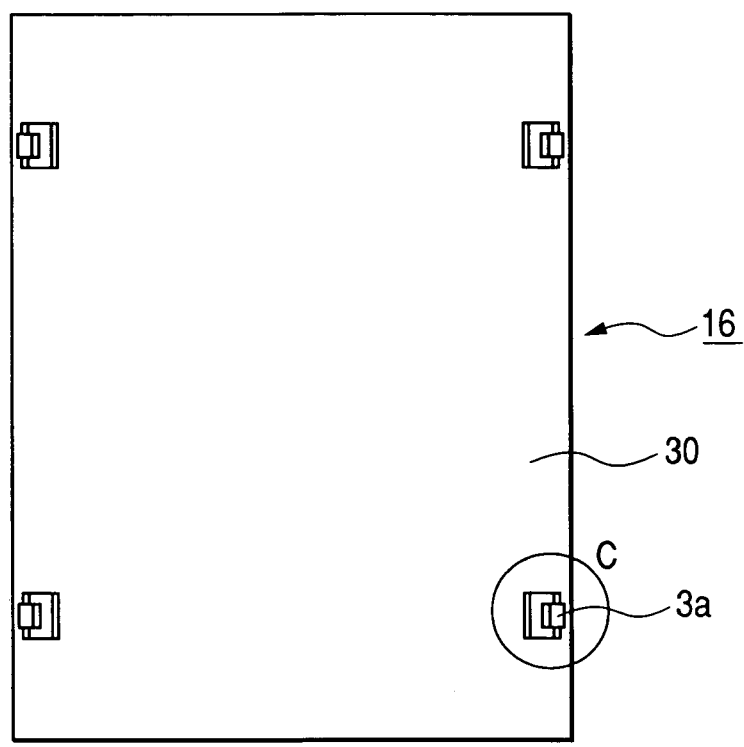
FIG. 4A is a rear plan view of a liquid crystal display module in accordance with an embodiment of the present invention.
Figure 4B:
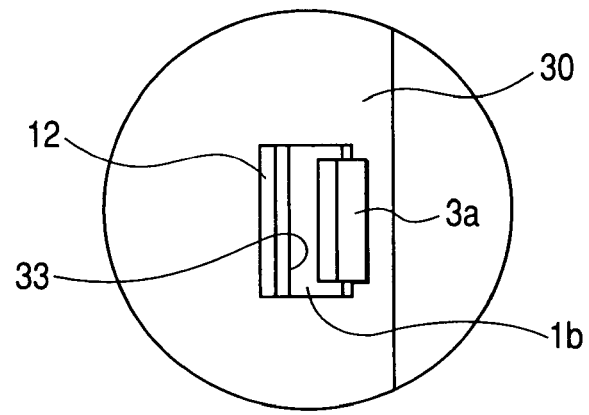
FIG. 4B is an enlarged view of a circled portion, designated C, of FIG. 4A.
Figure 4C:
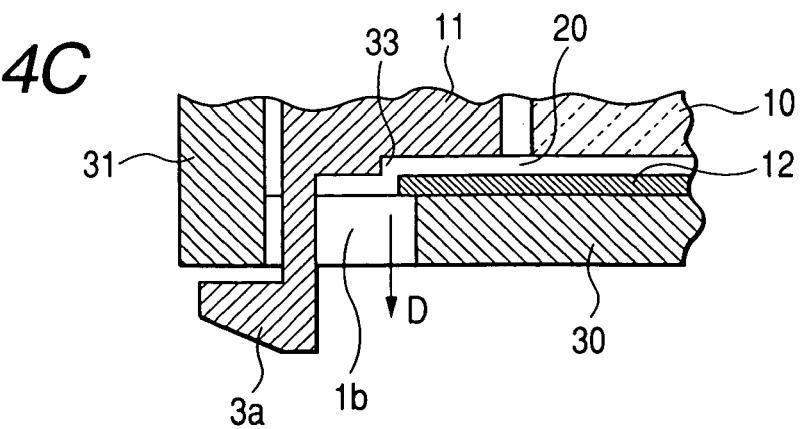
FIG. 4C is an illustration for explaining a problem which may arise in the configuration of the embodiment shown in FIG. 3C.

Prior to explaining Embodiment 2, a problem will be explained which may arise in Embodiment 1. FIGS. 4A and 4B are rear views of the above-explained liquid crystal display module of Embodiment 1, FIG. 4A is a rear plan view of the liquid crystal display module, and FIG. 4B is an enlarged view of a circled portion, designated C, of FIG. 4A. FIG. 4C is an illustration for explaining the problem which may arise in the configuration of Embodiment 1 shown in FIG. 3C.

In the configuration of Embodiment 1, as shown in FIG. 3C, a rectangular light reflective sheet 12 is disposed on the bottom portion 30 of the frame 16. In this case, a step 33 is formed on a surface of the mold 11 on its light-reflective-sheet-12 side for positioning the light reflective sheet 12. As shown in FIGS. 3C and 4B, the edge portion (the edge portion of the long side) of the light reflective sheet 12 and the step 33 is disposed over the through hole 1b made in the bottom portion 30 of the frame 16. In FIG. 3C, in a case where there is no gap between opposing portions of the mold 11 and the light reflective sheet 12, there arises no problem. However, in actuality, as shown in FIG. 4C, in some cases there is a gap 20 between opposing portions of the mold 11 and the light reflective sheet 12 due to dimensional tolerances of the components and variations in precision of manufacturing of the components, and therefore light from the light source 13 leaks toward the vicinities of the step 33 through the gap 20.

As described above, in Embodiment 1, the edge portion of the light reflective sheet 12 and the step 33 are visible through the through hole 1b in the bottom portion 30 of the frame 16, the leakage of light in the vicinities of the step 33 is visible from the Y direction (the direction indicated by an arrow D in FIG. 4C) outside of the frame 16.

In the following, Embodiment 2 will be explained which is capable of reducing the above-explained light leaking in the Y direction from the vicinities of the step 33.

Figure 5:
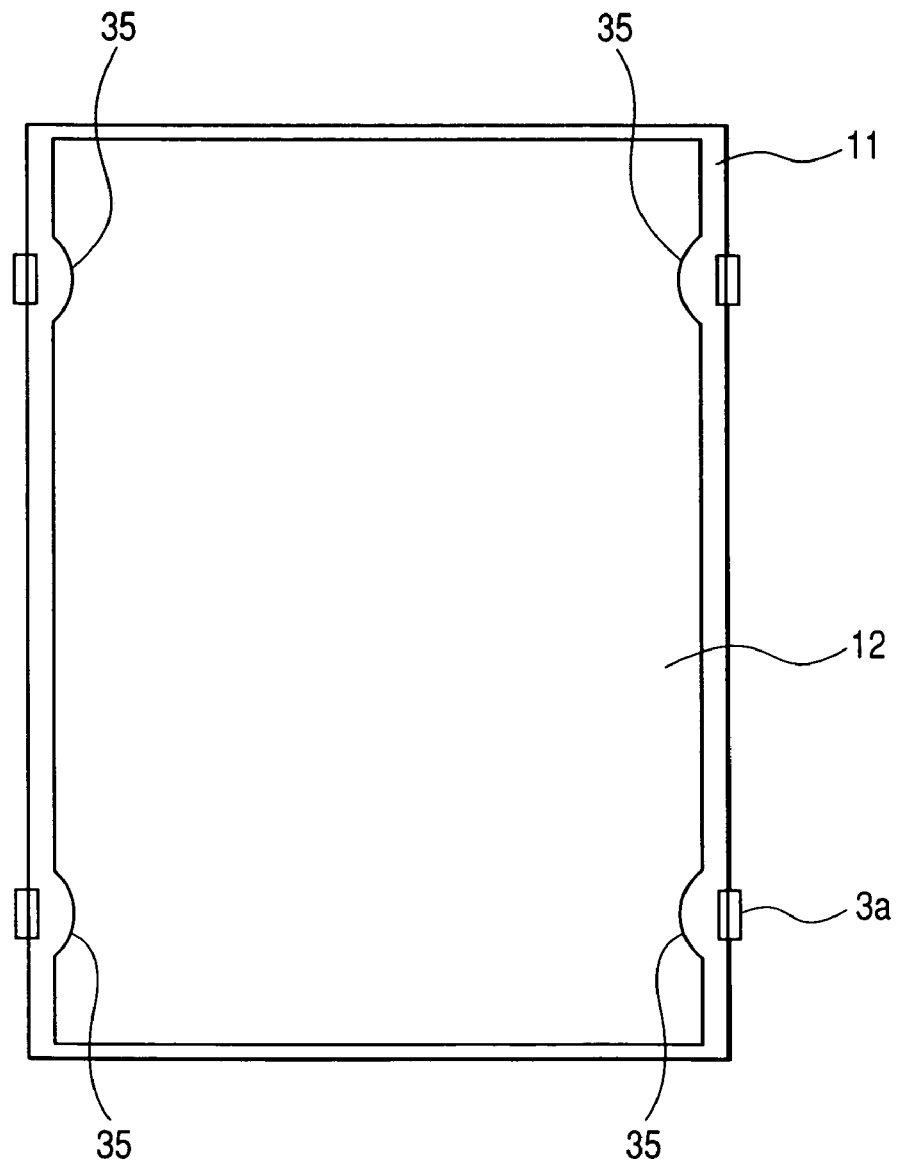
FIG. 5 is an illustration for explaining a shape of a light reflective sheet and a step of a mold of a liquid crystal display module in accordance with an embodiment of the present invention.

FIG. 5 is an illustration for explaining the shape of the light reflective sheet 12 and the step 33 of the mold 11 of the liquid crystal display module in accordance with Embodiment 2, and is a plan view of the light reflective sheet 12 disposed on the mold 11 viewed from the side of the light reflective sheet 12 prior to fitting the mold 11 with the frame 16. Cutouts 35 are formed at regions of the light reflective sheet 12 lying over the through hole 1b in the bottom portion 30 of the frame 16 so that the light reflective sheet 12 does not lie over the through hole 1b in the bottom portion 30 of the frame 16. Further, the steps 33 of the mold 11 for positioning the light reflective sheet 12 are formed so that they do not to lie over the through hole 1b in the bottom portion 30 of the frame 16, considering the shape of the light reflective sheet 12.

Figure 6A:
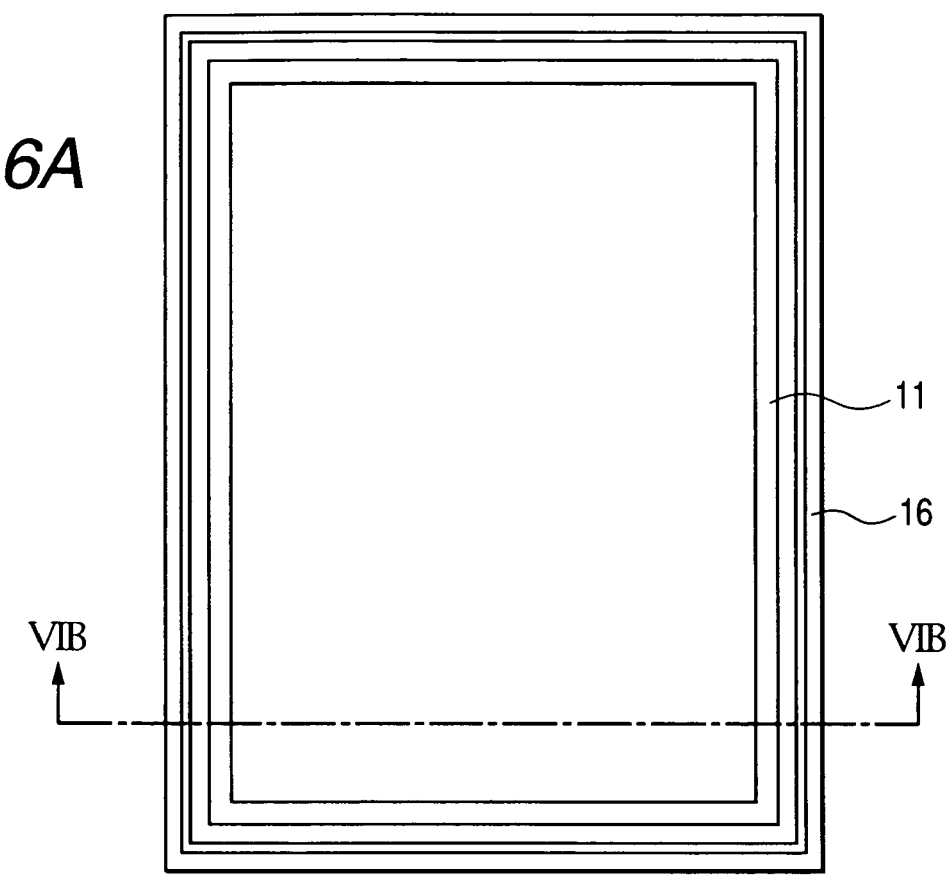
FIG. 6A is a plan view showing a condition in which the mold is fitted within the frame.
Figure 6B:
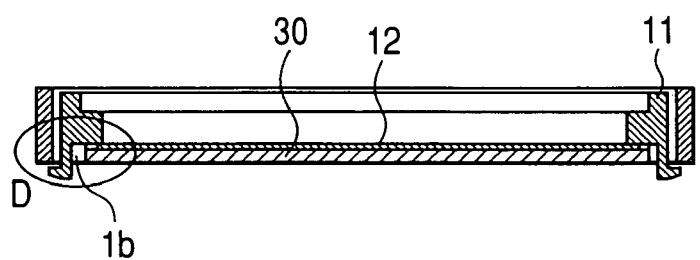
FIG. 6B is a cross-sectional view of the assembly of FIG. 6A taken along line VIB-VIB of FIG. 6A.
Figure 6C:
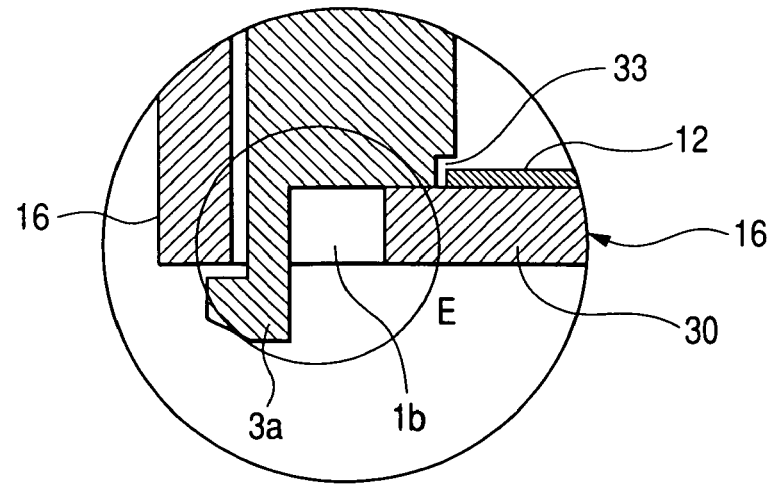
FIG. 6C is an enlarged view of a circled portion, designated D, of FIG. 6B.
Figure 7A:
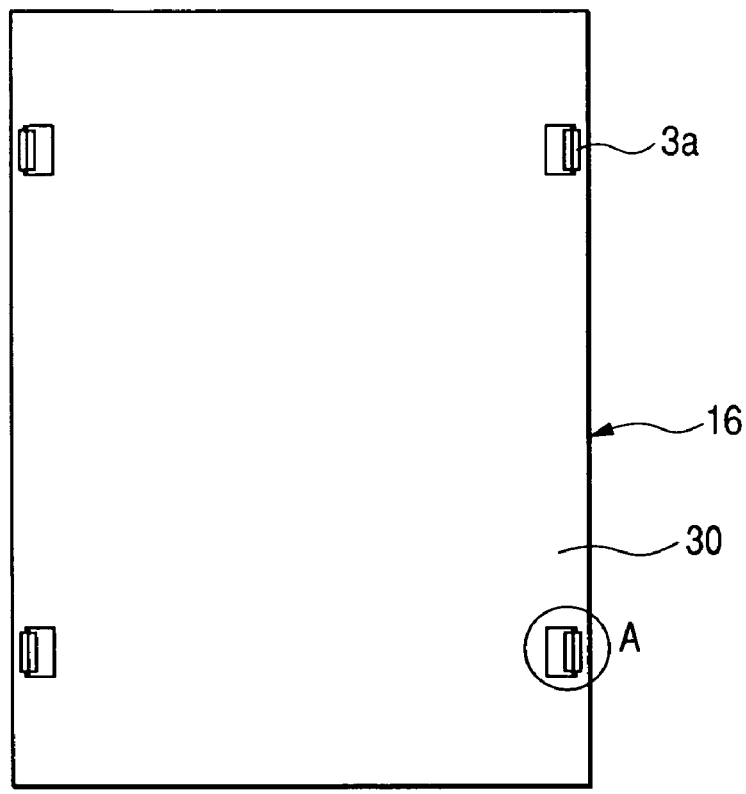
FIG. 7A is a rear plan view of the liquid crystal display module.
Figure 7B:
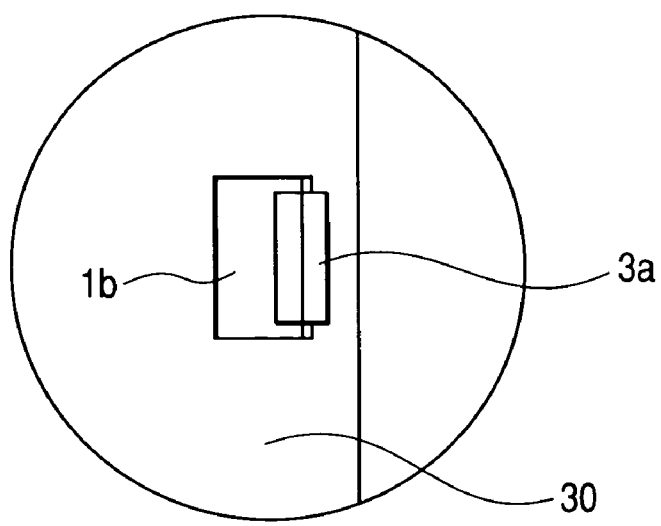
FIG. 7B is an enlarged view of a circled portion, designated A, of FIG. 7A.

FIGS. 6A to 6C are illustrations for explaining a method of fixing together the mold 11 and the frame 16 in accordance with Embodiment 2, FIG. 6A is a plan view showing a condition in which the mold 11 is fitted within the frame 16, FIG. 6B is a cross-sectional view of the assembly of FIG. 6A taken along line VIB-VIB of FIG. 6A, and FIG. 6C is an enlarged view of a circled portion, designated D, of FIG. 6B. FIGS. 7A and 7B are views of the liquid crystal display module of Embodiment 2 viewed from its rear side, FIG. 7A is a rear plan view of the liquid crystal display module, and FIG. 7B is an enlarged view of a circled portion, designated A, of FIG. 7A.

Consequently, in Embodiment 2, as shown in a circled portion, designated E, of FIG. 6C and FIG. 7B, the edge portions (the edge portions of the long sides) of the light reflective sheet 12 or the steps 33 of the mold 11 are not visible through the through holes 1b made in the bottom portion 30 of the frame 16, and Embodiment 2 is capable of reducing the leakage of light from the vicinities of the steps 33 in the Y direction (the direction indicated by the arrow D in FIG. 4C.

Embodiment 3

As in the case of the frame 16 shown in FIG. 18D and utilized for the prior art explained in connection with FIGS. 17A to 19C, the frame 16 utilized for this Embodiment 3 is provided with through holes 1b extending from the bottom portion 30 of the frame 16 into the sidewall 31 of the frame 16. However, in Embodiment 3, the size of the through holes 1b in the frame 16 are reduced such that the edge portions (the edge portions of the long sides) of the light reflective sheet 12 or the steps 33 of the mold 11 are not visible through the through holes 1b made in the bottom portion 30 of the frame 16.

FIG. 8A is an illustration for explaining the frame 16 in accordance with Embodiment 3, and shows a through hole 1b made in the bottom portion 30 of the frame 16. For comparison purposes, FIG. 8B is an illustration for showing the through hole 1b made in the prior art frame 16 explained in connection with FIGS. 17A to 19C. Here FIGS. 8A and 8B are enlarged views of the through holes 16 and their vicinities viewed from the rear side of the frame 16.

Embodiment 3 shown in FIG. 8A is also capable of reducing light leakage from the vicinities of the step 33 (see FIG. 4C) in the Y direction (the direction indicated by the arrow D in FIG. 4C).

Incidentally, while FIG. 8A illustrates a case where Embodiment 3 is applied to the frame 16 provided with the through holes 1b extending continuously from the bottom portion 30 into the sidewall 31, Embodiment 3 is also applicable to the frame 16 provided with the through holes 1b which are formed in the bottom portion 30 along the sidewall 31, but which do not extend into the sidewall 31 (that is, the through hole 1b are not made in the sidewall 31), as in the case of Embodiment 1.

Further, Embodiment 3 is applicable to the following two cases: one is a case where the light reflective sheet 12 is provided with the cutouts 35 such that the light reflective sheet 12 does not lie over the through holes 1b made in the bottom portion 30 of the frame 16 as in the case of Embodiment 2; and the other is a case where the light reflective sheet 12 is not provided with the cutouts 35.

Embodiment 4

Figure 9A:
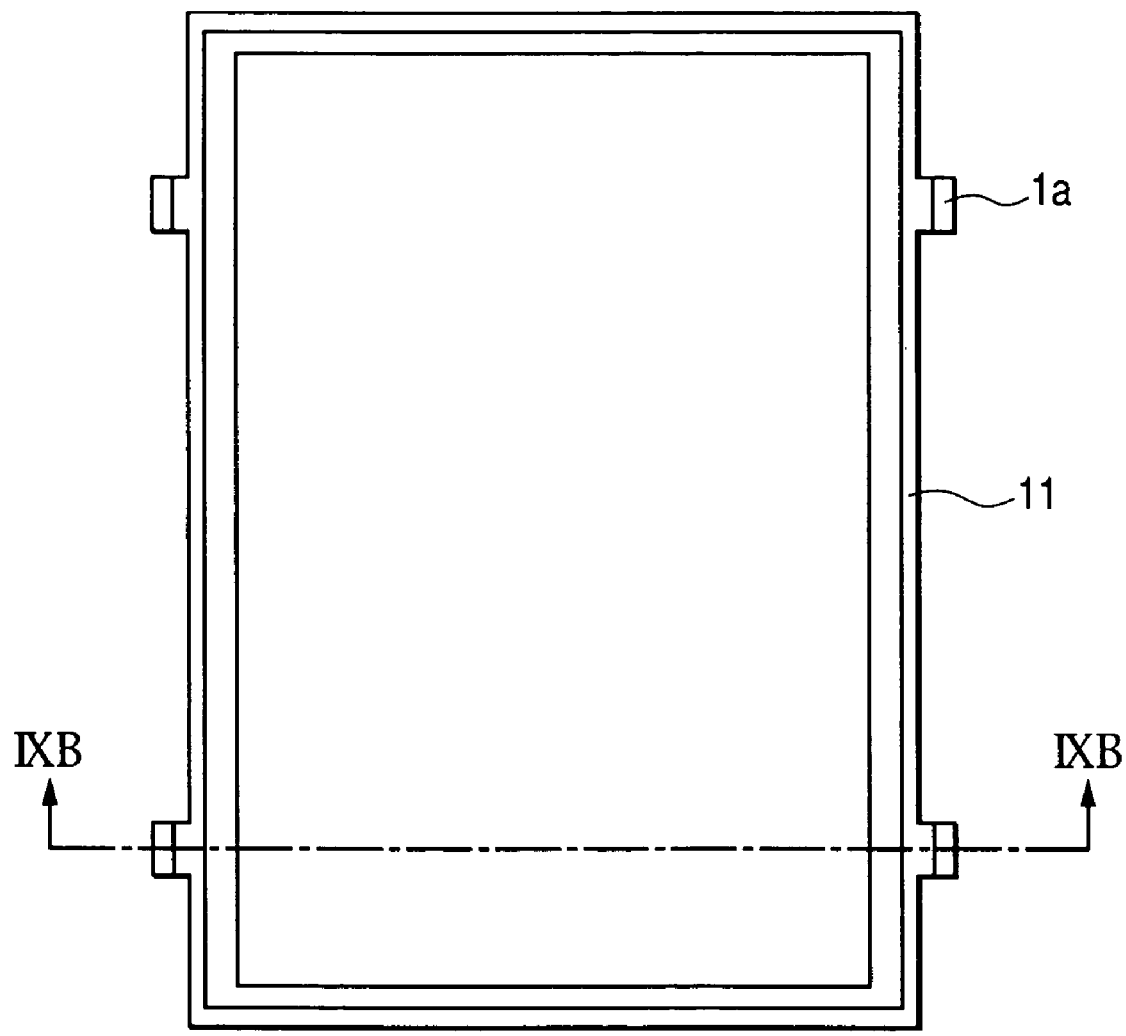
FIG. 9A is a plan view of a mold in accordance with still another embodiment of the present invention.
Figure 9B:
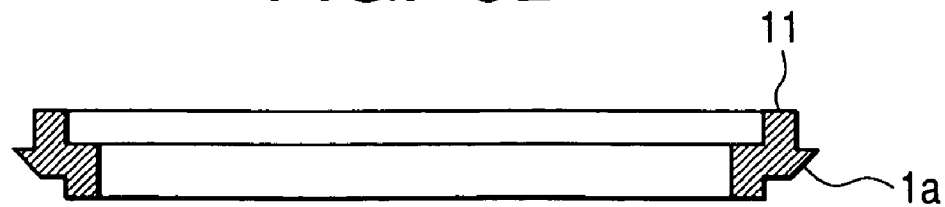
FIG. 9B is a cross-sectional view of the mold of FIG. 9A taken along line IXB-IXB of FIG. 9A.
Figure 10A:
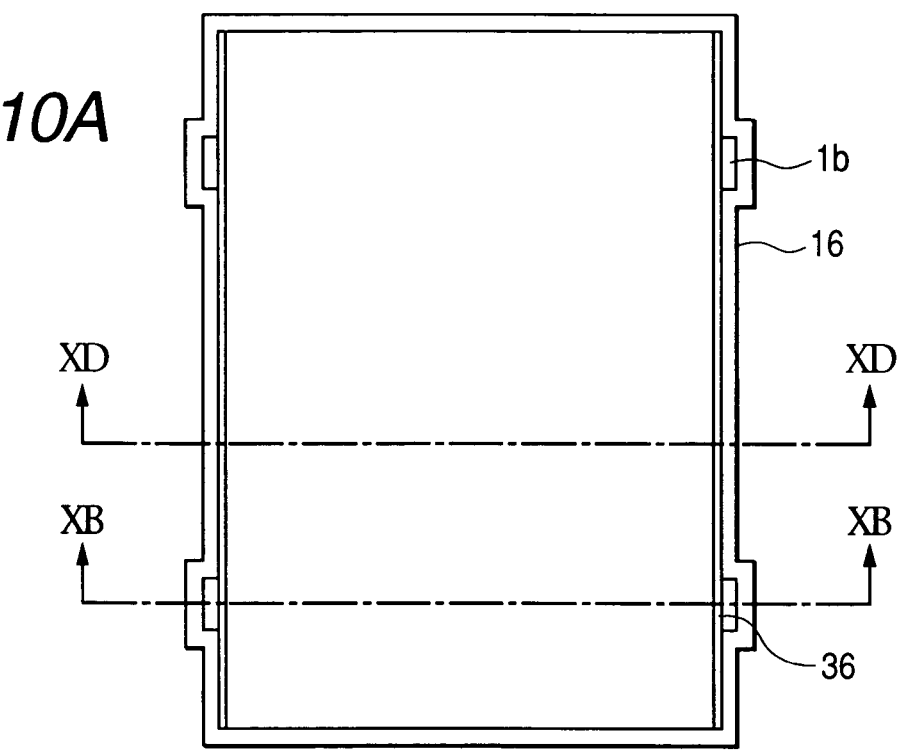
FIG. 10A is a plan view of a frame in accordance with an embodiment of the present invention.
Figure 10B:
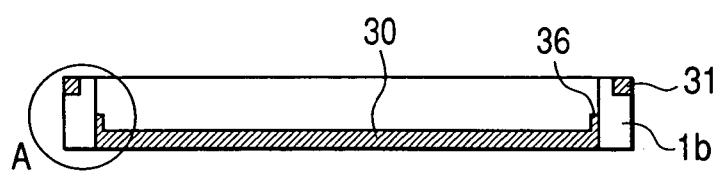
FIG. 10B is a cross-sectional view of the frame of FIG. 10A taken along line XB-XB of FIG. 10A.
Figure 10C:
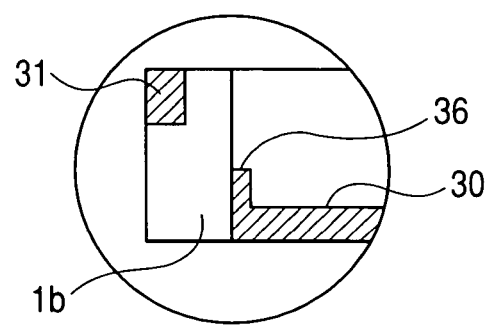
FIG. 10C is an enlarged view of a circled portion, designated A, of FIG. 10B.
Figure 10D:
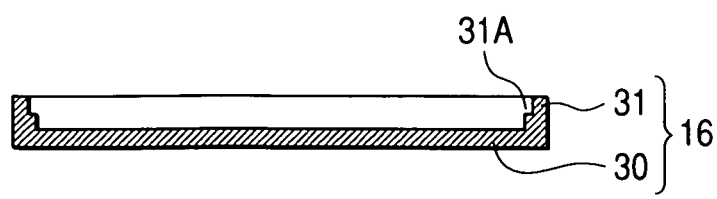
FIG. 10D is a cross-sectional view of the frame of FIG. 10A taken along line XD-XD of FIG. 10A.
Figure 11A:
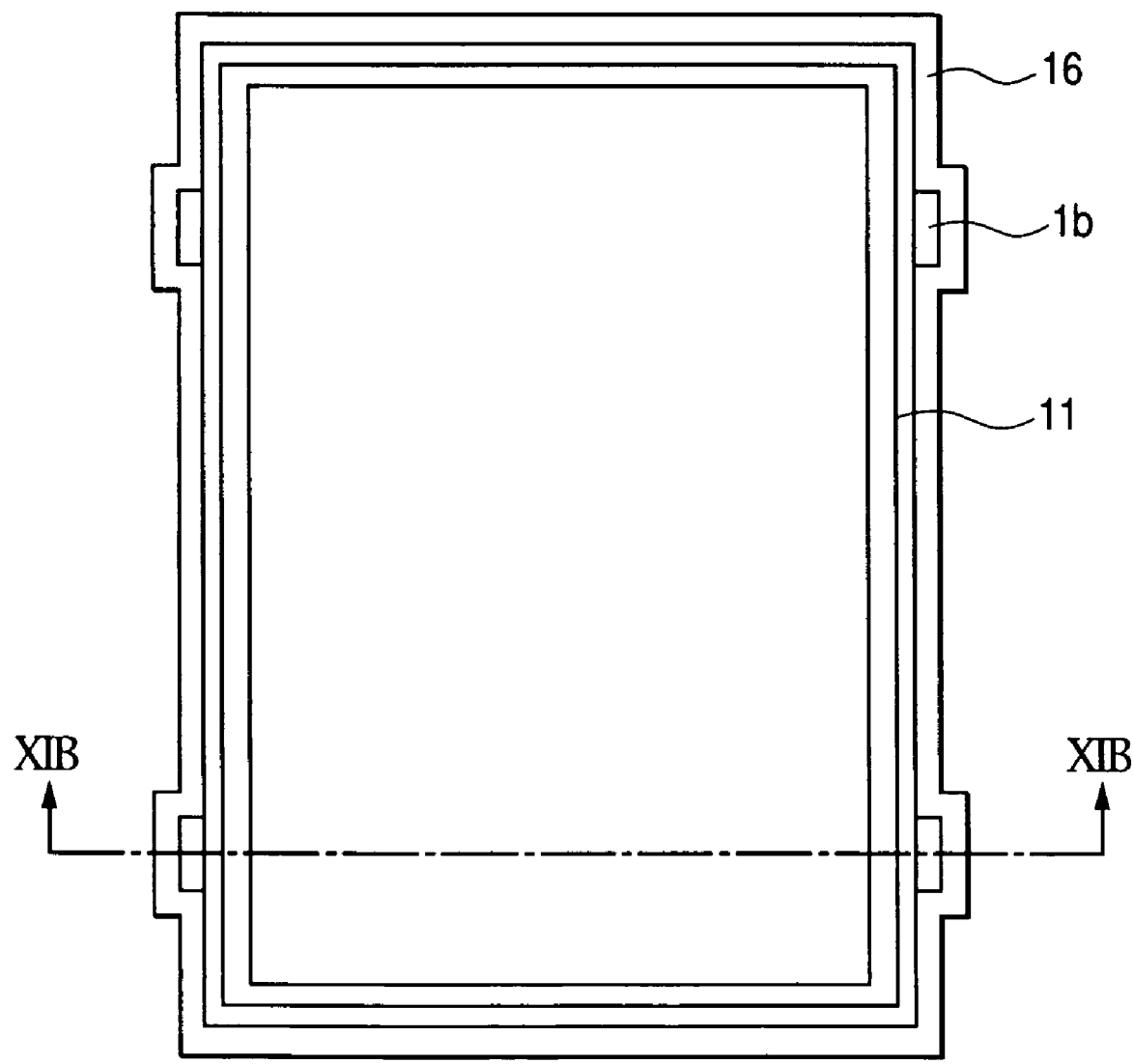
FIG. 11A is a plan view of an assembly of the mold and the frame in accordance with an embodiment of the present invention.
Figure 11B:
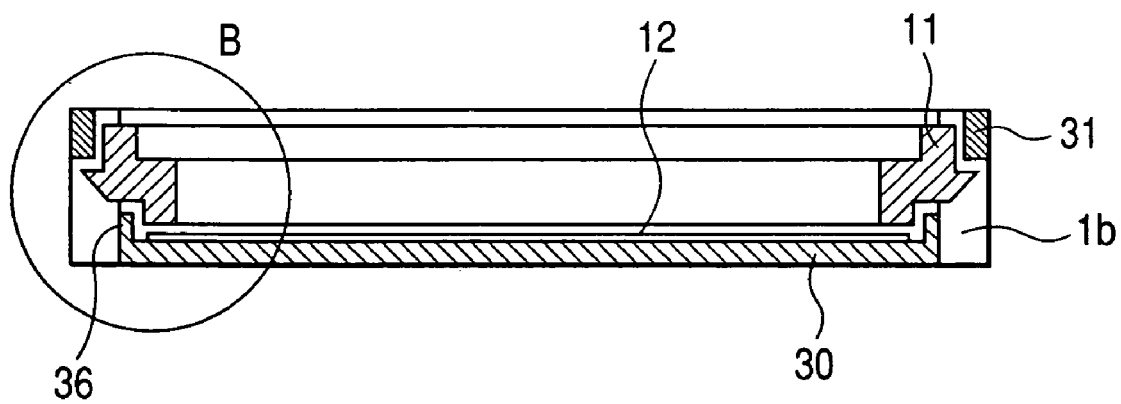
FIG. 11B is an enlarged cross-sectional view of the assembly of FIG. 11A taken along line XIB-XIB of FIG. 11A.
Figure 11C:
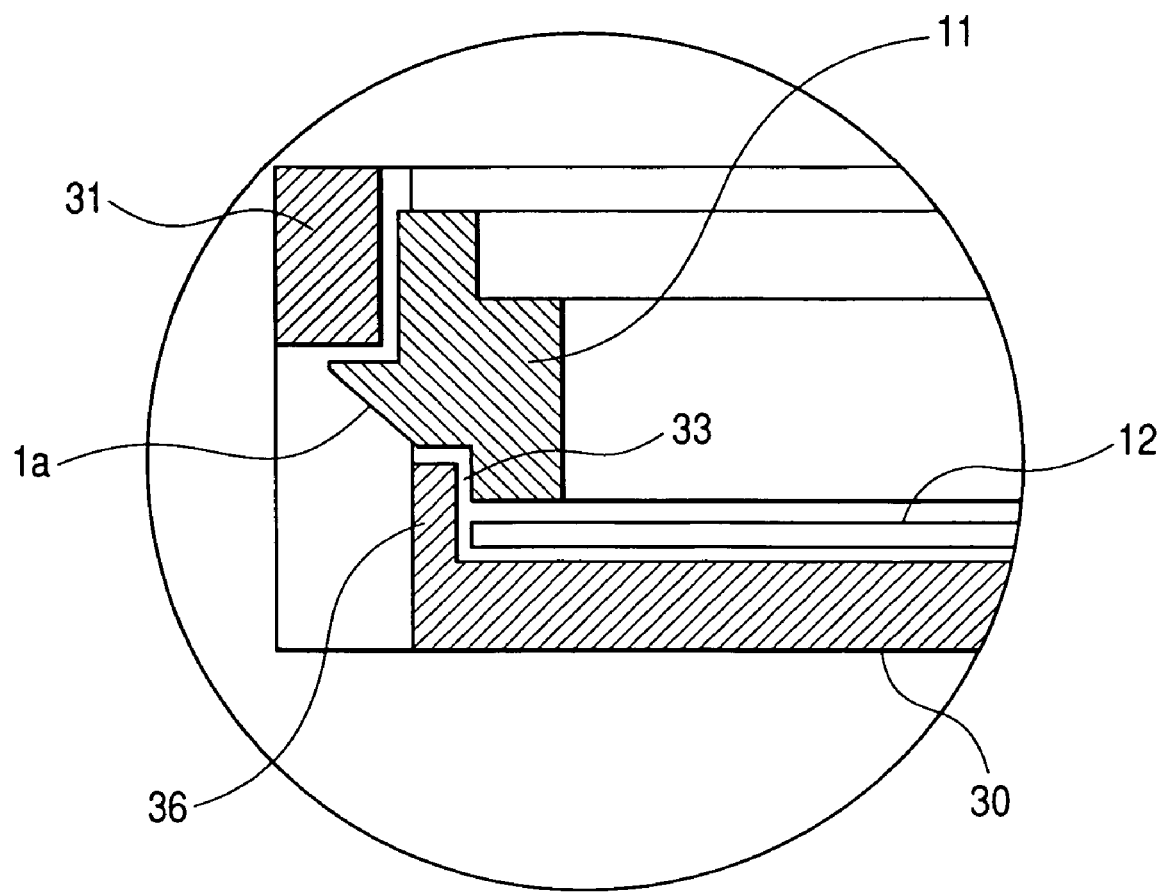
FIG. 11C is an enlarged view of a circled portion, designated B, of FIG. 11B.

FIGS. 9A and 9B are illustrations for explaining the mold 11 in accordance with Embodiment 4, FIG. 9A is a plan view of the mold 11, and FIG. 9B is a cross-sectional view of the mold 11 of FIG. 9A taken along line IXB-IXB of FIG. 9A. FIGS. 10A to 11C are illustrations for explaining a frame 16 in accordance with Embodiment 4, FIG. 10A is a plan view of the frame 16, FIG. 10B is a cross-sectional view of the frame 16 of FIG. 10A taken along line XB-XB of FIG. 10A, FIG. 10C is an enlarged view of a circled portion, designated A, of FIG. 10B, and FIG. 10D is a cross-sectional view of the frame 16 of FIG. 10A taken along line XD-XD of FIG. 10A. FIGS. 11A to 11C are illustrations for explaining a method of fixing together the mold 11 and the frame 16 in accordance with Embodiment 4, FIG. 11A is a plan view of an assembly of the mold 11 and the frame 16, FIG. 11B is an enlarged cross-sectional view of the assembly of FIG. 11A taken along line XIB-XIB of FIG. 11A, and FIG. 11C is an enlarged view of a circled portion, designated B, of FIG. 11B.

As shown in FIG. 10D, Embodiment 4 provides a step portion 31A in the sidewall 31 on the long sides of the bottom portion 30 of the frame 16 which is utilized in Embodiment 3 and which is a die cast frame formed of magnesium alloy, for example, and as shown in FIG. 10A Embodiment 4 provides the through holes 1b at desired positions. This configuration of the frame 16 provides wall-like protrusions 36 capable of preventing leakage of light at positions where the through hole 1b are made.

To realize the above-explained configuration, in Embodiment 4, regions of the frame 16 formed with the through holes 1b are expanded outwardly as shown in FIG. 11A, and engaging portions 1a formed on the sidewall are disposed at outside positions.

In Embodiment 4, as shown in FIG. 11C, the edge portions (the edge portions of the long sides) of the light reflective sheet 12 or the steps 33 of the mold 11 are not visible through the through holes 1b made in frame 16, and consequently, Embodiment 4 is capable of reducing light leakage from the vicinities of the step 33 in the Y direction (the direction indicated by the arrow D in FIG. 4C).

Embodiment 5

The reason why the above-described light leakage is that the edge portions (the edge portions of the long sides) of the light reflective sheet 12 and the steps 33 of the mold 11 are visible through the through holes 1b made in the frame 16.

Embodiment 5 and subsequent Embodiment 6 prevent light leakage from the gap between the steps 33 and the light reflective sheet 12 by configuring the edge portions (the edge portions of the long sides) of the light reflective sheet 12 and the steps 33 of the mold 11 so as not to be visible from the outside of the frame 16.

Figure 12A:
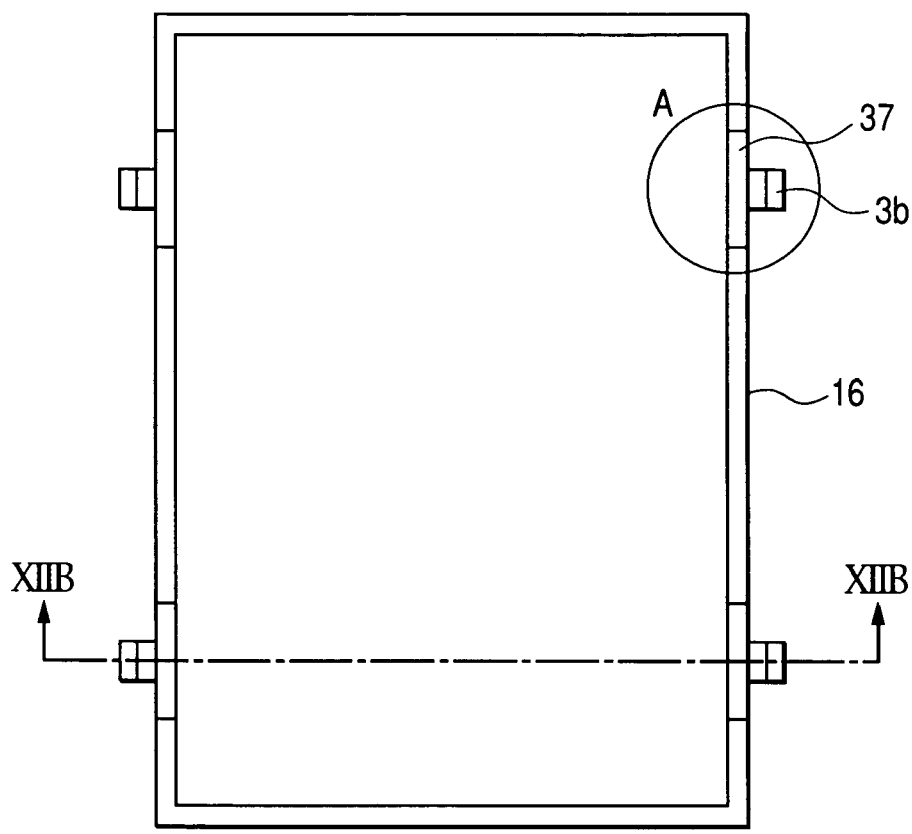
FIG. 12A is a plan view of a frame in accordance with an embodiment of the present invention.
Figure 12B:
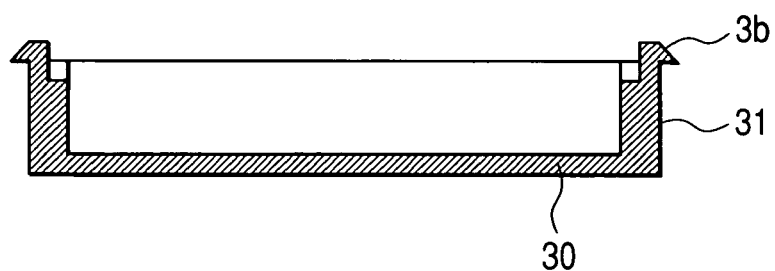
FIG. 12B is a cross-sectional view of the frame of FIG. 12A taken along line XIIB-XIIB of FIG. 12A.
Figure 12C:
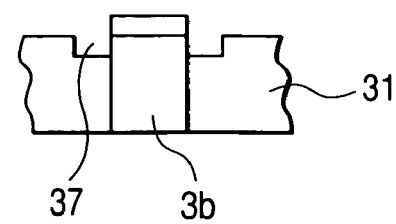
FIG. 12C is a side view of a circled portion, designated A, of FIG. 12A.

FIGS. 12A to 12C are illustrations for explaining a frame 16 in accordance with Embodiment 5, FIG. 12A is a plan view of the frame 16, FIG. 12B is a cross-sectional view of the frame 16 of FIG. 12A taken along line XIIB-XIIB of FIG. 12A, and FIG. 12C is a side view of a circled portion, designated A, of FIG. 12A.

Figure 13A:
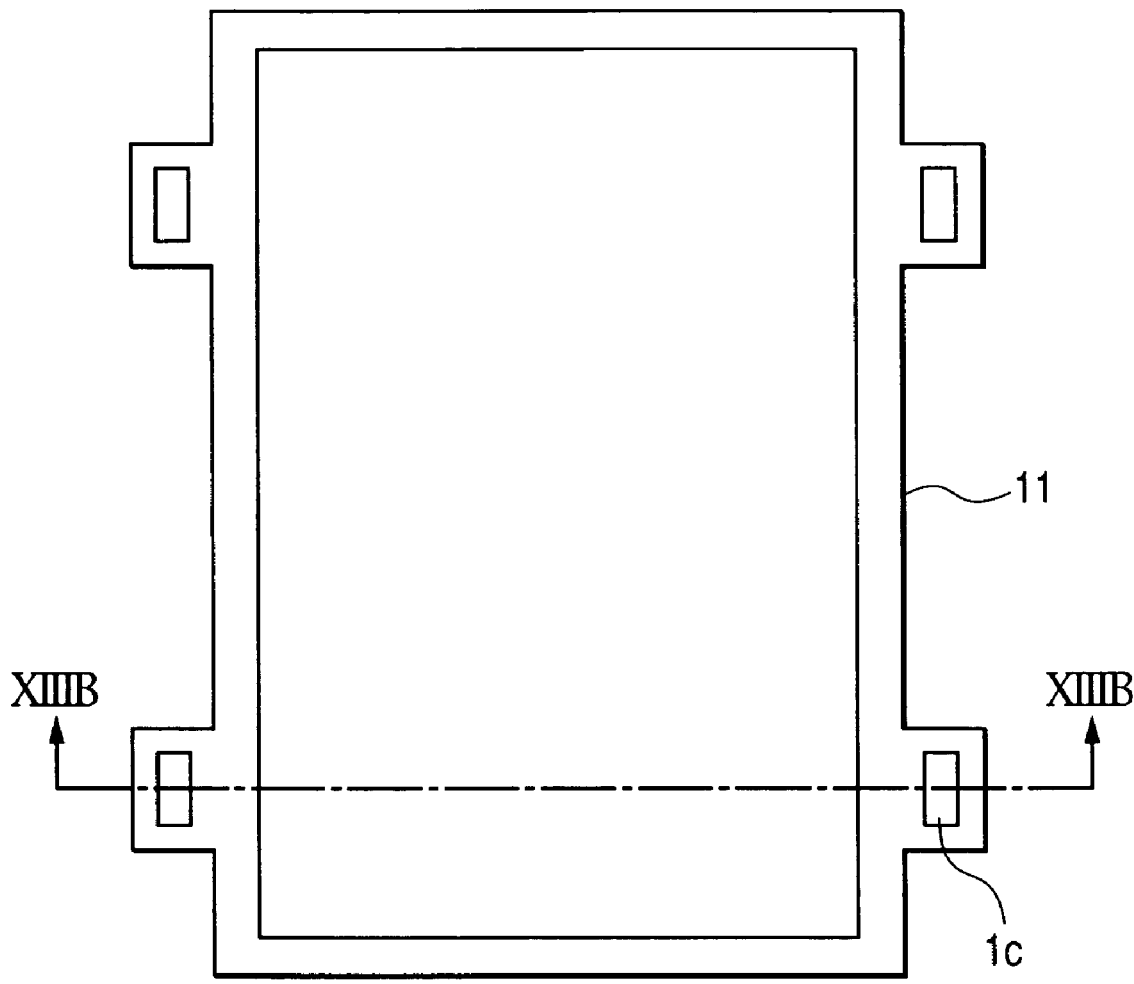
FIG. 13A is a plan view of a mold 11 in accordance with an embodiment of the present invention.
Figure 13B:
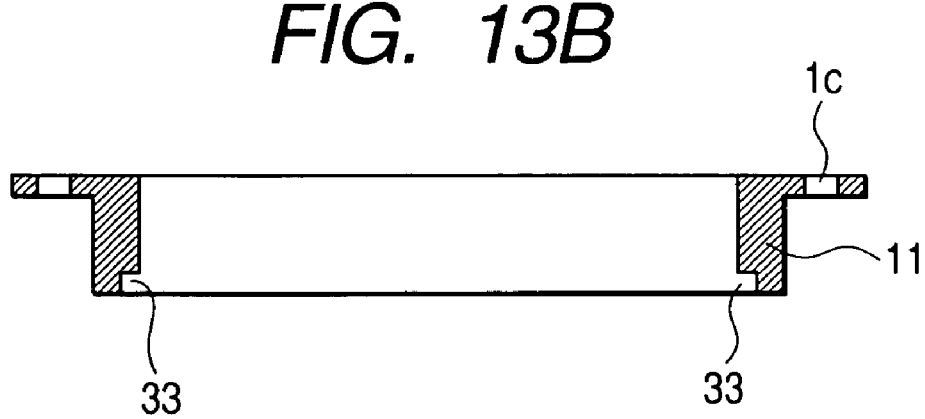
FIG. 13B is a cross-sectional view of the mold of FIG. 13A taken along line XIIIB-XIIIB of FIG. 13A.

FIGS. 13A and 13B are illustrations for explaining a mold 11 in accordance with Embodiment 5, FIG. 13A is a plan view of the mold 11, and FIG. 13B is a cross-sectional view of the mold 11 of FIG. 13A taken along line XIIIB-XIIIB of FIG. 13A.

Figure 14A:
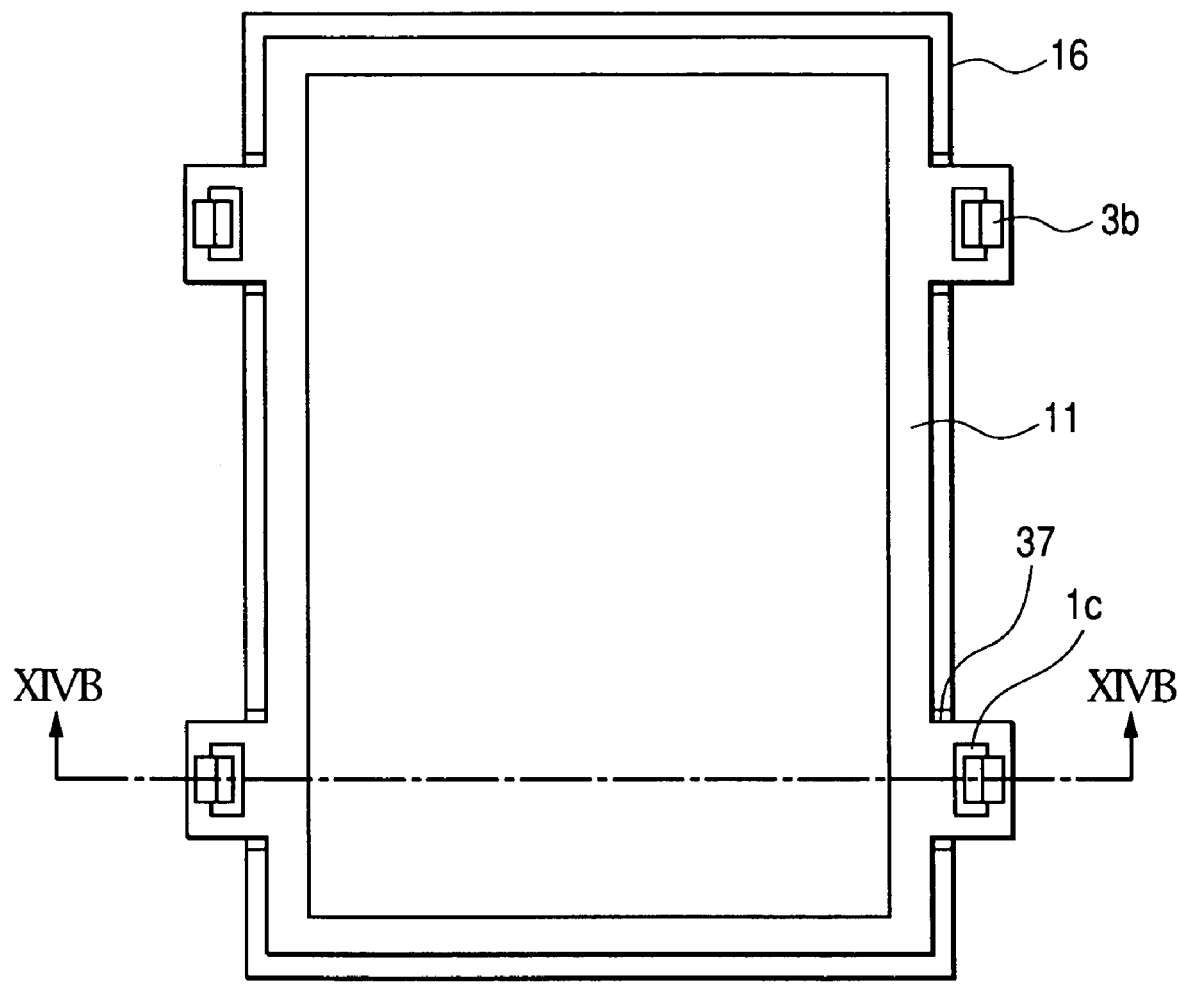
FIG. 14A is an plan view of an assembly of the mold and the frame in accordance with an embodiment of the present invention.
Figure 14B:
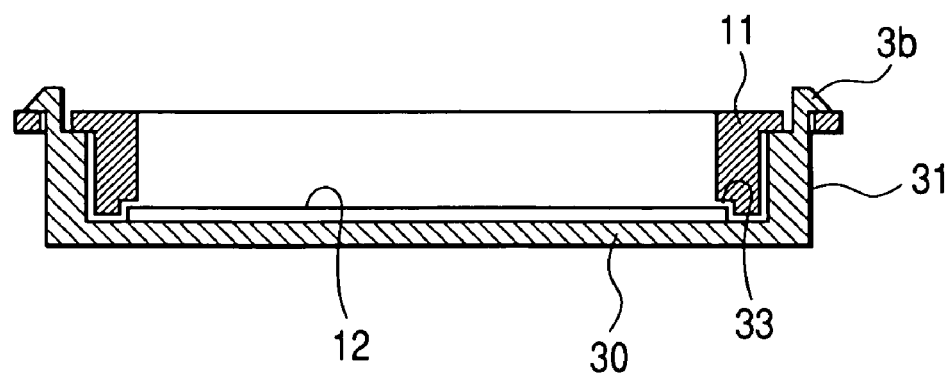
FIG. 14B is a cross-sectional view of the assembly of FIG. 14A taken along line XIVB-XIVB of FIG. 14A.

FIGS. 14A and 14B are illustrations for explaining a method of fixing together the mold 11 and the frame 16 in accordance with Embodiment 5, FIG. 14A is an plan view of an assembly of the mold 11 and the frame 16, and FIG. 14B is a cross-sectional view of the assembly of FIG. 14A taken along line XIVB-XIVB of FIG. 14A.

As shown in FIGS. 12A to 12C, the frame 16 of Embodiment 5 is provided with protrusions 3b on the sidewall 31 of the frame 16 for the engaging purpose. In Embodiment 5, as shown in FIGS. 13A and 13B, regions on the top of the mold 11 corresponding to the above-mentioned protrusions 3b, respectively, are projecting outwardly, and through holes 1c are made in those projecting regions.

As shown in FIGS. 14A and 14B, in Embodiment 5, the mold 11 is fixed to the frame 16 by inserting the engaging protrusions 3b provided to the frame 16 into the through holes 1c made in the mold 11, and engaging the tips of the engaging protrusions 3a with (or hooking the tips of the engaging protrusions 3a to) the vicinities of the through holes 1c in the mold 11. In this configuration of Embodiment 5, recesses 37 are formed in the sidewall 31 of the frame 16 as shown in FIG. 12C. Each of the recesses 37 is formed so as to extend beyond opposite ends of a corresponding one of the engaging protrusions 3b. As shown in FIGS. 14A and 14B, the projecting regions of the mold 11 each perforated with the through hole 1c are fitted into the recesses 37.

With the configuration of Embodiment 5, the edge portions (the edge portions of the long sides) of the light reflective sheet 12 or the steps 33 of the mold 11 are not visible from the outside of the frame 16. Consequently, Embodiment 5 is capable of preventing the light leakage from the vicinities of the steps 33 of the mold 11.

Embodiment 6

Figure 15A:
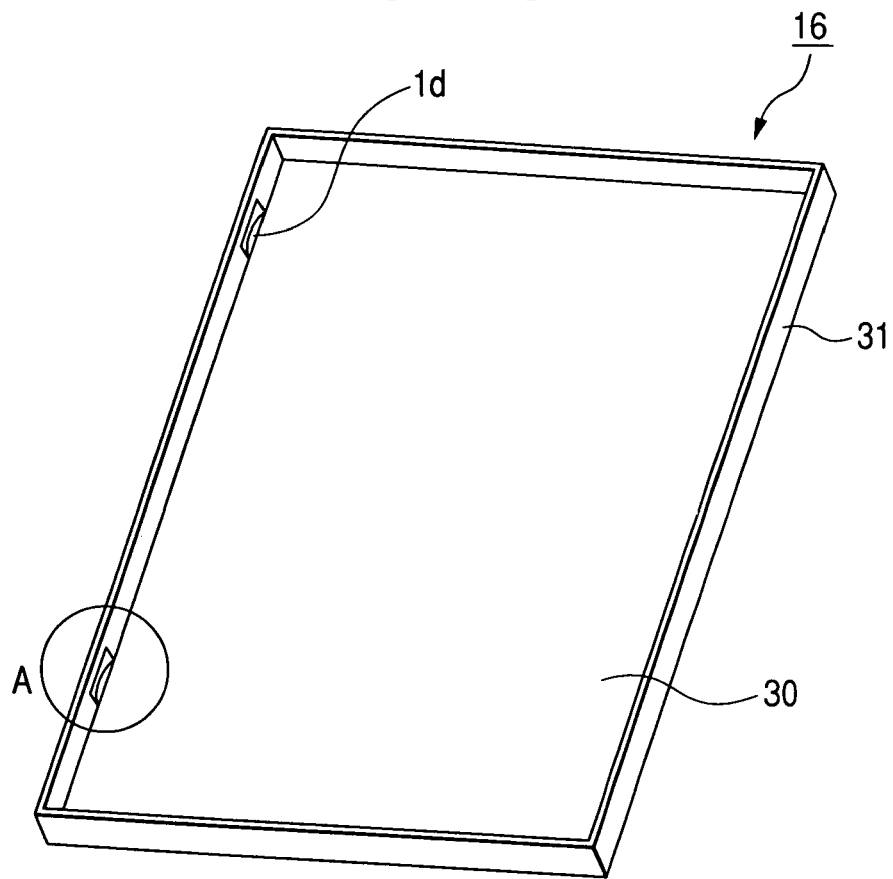
FIG. 15A is a perspective view of a frame in accordance with an embodiment of the present invention.
Figure 15B:
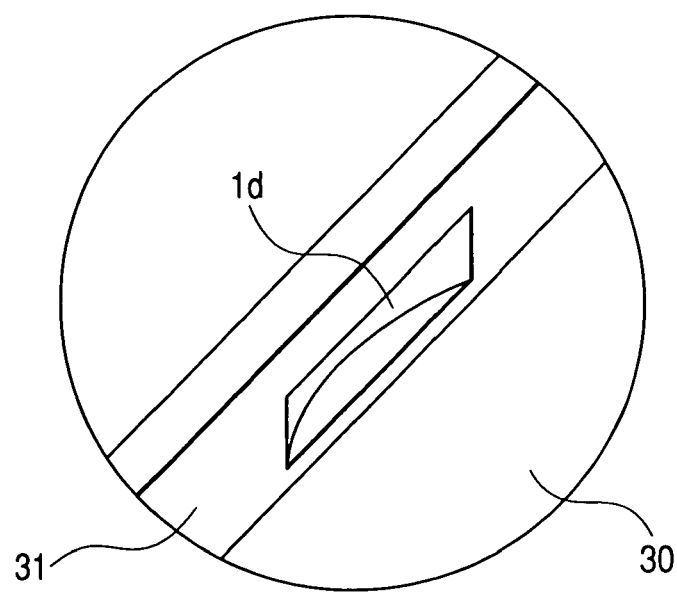
FIG. 15B is an enlarged view of a circled portion, designated A, of FIG. 15A.

FIGS. 15A and 15B are illustrations for explaining a frame 16 in accordance with Embodiment 6, FIG. 15A is a perspective view of the frame 16, and FIG. 15B is an enlarged view of a circled portion, designated A, of FIG. 15A.

Embodiment 6 uses a frame and a mold similar to the prior art frame 16 and the prior art mold 11 explained in connection with FIGS. 17A to 19C. As shown in FIGS. 15A and 15B, the frame 16 utilized for this Embodiment 3 is provided with recesses 1d in an inner surface of the sidewall 31 of the frame 16 to be engaged with the tips 1a of the engaging portions 1a provided to the sidewall of the mold 11.

In Embodiment 6, the mold 11 is fixed to the frame 16 by inserting the engaging portions 1a (see FIGS. 17A and 17B) provided to the mold 11 into the recesses 1d formed in the inner surface of the sidewall 31 of the frame 16, and engaging the tips of the engaging portions 1a with the sidewall 31 of the frame 16 (or hooking the tips to the sidewall 31).

With the configuration of Embodiment 6, the edge portions (the edge portions of the long sides) of the light reflective sheet 12 (not shown) or the steps 33 (not shown) of the mold 11 are not visible from the outside of the frame 16. Consequently, Embodiment 6 is also capable of preventing the light leakage from the vicinities of the steps 33 (see FIG. 4C) of the mold 11.

The invention made by the present inventors has been explained concretely based on the embodiments, and it is needless to say that the present invention is not limited to the above-described embodiments, and that various changes and modifications can be made without departing from the true spirit and scope of the present invention.

What is claimed is:

1. A liquid crystal display device comprising:
a liquid crystal display panel having liquid crystal material sandwiched between a pair of substrates;
optical components disposed behind said liquid crystal display panel;
a frame-like mold which houses said liquid crystal display panel and said optical components;
a light reflective sheet disposed behind said frame-like mold; and
a frame which houses said frame like mold and said light reflective sheet, wherein
said frame comprises a bottom portion and a sidewall formed along a periphery of said bottom portion,
a plurality of engaging though holes are formed at said bottom portion along said side wall not to extend into said side wall,
said side wall is continuous at positions adjacent to said engaging through holes,
said light reflective sheet is disposed on an upper surface of said bottom portion of said frame, and is provided with a plurality of cutouts disposed correspondingly to said plurality of engaging though holes such that said light reflective sheet does not lie over said plurality of engaging through holes,
said frame like mold is provided with a plurality of engaging protrusions which are disposed correspondingly to said plurality of engaging holes and protrude downward beyond a lower surface of said frame-like mold,
said frame-like mold and said frame are fixed together by inserting each of said plurality of engaging protrusions into a corresponding one of said plurality of engaging through holes, and
said plurality of engaging protrusions pass through said bottom portion from one side to the other side through said plurality of engaging through holes.

2. The liquid crystal display device according to claim 1, wherein said frame-like mold and said frame are fixed together by engaging tips of said plurality of engaging protrusions with said sidewall of said frame.

3. The liquid crystal display device according to claim 1, wherein said frame-like mold is provided with a step on said lower surface thereof for positioning an edge of said light reflective sheet such that said step does not lie over said plurality of engaging through holes.

4. A liquid crystal display device comprising:
a liquid crystal display panel having liquid crystal material sandwiched between a pair of substrates;
optical components disposed behind said liquid crystal display panel;
a frame like mold which houses said liquid crystal display panel and said optical components; and
a frame which houses said frame like mold, wherein
said frame comprises a bottom portion and a sidewall formed along a periphery of said bottom portion,
a plurality of engaging through holes are formed at said bottom portion along said side wall not to extend into said side wall,
said side wall is continuous at positions adjacent to said engaging through holes,
said frame-like mold is provided with a plurality of engaging protrusions which are disposed correspondingly to said plurality of engaging holes and protrude downward beyond a lower surface of said frame-like mold,
said frame-like mold and said frame are fixed together by inserting each of said plurality of engaging protrusions into a corresponding one of said plurality of engaging through holes, and
said plurality of engaging protrusions pass through said bottom portion from one side to the other side through said plurality of engaging through holes.

5. The liquid crystal display device according to claim 4, wherein said frame-like mold and said frame are fixed together by engaging tips of said plurality of engaging protrusions with said sidewall of said frame.

* * * * *